(12) United States Patent
Kane

(10) Patent No.: US 7,732,751 B2
(45) Date of Patent: *Jun. 8, 2010

(54) OPTICAL SYSTEMS AND METHODS USING MICROELECTROMECHANICAL-SYSTEMS MIRRORS EXCEEDING THIRTY MICRONS

(75) Inventor: David M. Kane, Tucson, AZ (US)

(73) Assignee: Arete' Associates, Northridge, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 11/796,603

(22) Filed: Apr. 28, 2007

(65) Prior Publication Data

US 2009/0015891 A1    Jan. 15, 2009

Related U.S. Application Data

(63) Continuation-in-part of application No. 11/151,594, filed on Jun. 13, 2005, now Pat. No. 7,297,934.

(51) Int. Cl.
*H01J 5/16* (2006.01)
(52) U.S. Cl. ........................... 250/216; 250/234
(58) Field of Classification Search .............. 250/216, 250/239, 221, 208.1, 234, 235; 359/197–291; 385/24, 140, 73
See application file for complete search history.

(56) References Cited

U.S. PATENT DOCUMENTS 7,177,497 B2 *   2/2007   Barrett ...................... 385/24

\* cited by examiner

*Primary Examiner*—Que T Le
(74) *Attorney, Agent, or Firm*—Peter I. Lippman

(57) ABSTRACT

A detector and aperture determine radiation characteristics, including angular direction throughout a specified range, of external articles. Preferably an afocal aperture element enlarges/reduces the article and volume FOR. Mirror(s) along a path between detector and aperture, rotatable about plural axes, make the detector address varying regions. Preferably each mirror is MEMS, exceeding five to thirty microns. The detector "sees" articles throughout the range, at constant magnification. Other aspects rotate magnetically controlled dual-axis MEMS mirrors, each with electrical coils opposed across an axis, and anther magnet whose field interacts with coil-current fields, generating force components: one includes oppositely directed forces, torquing the mirrors; another thrusts mirrors outward from the array rest plane, causing variable "piston". Alternatively, other forces pull mirror(s) outward—and the second component attracts them inward. Components are adjusted to steer a beam in a desired direction, and wavefronts from adjacent mirrors are in phase for finer diffraction limit.

60 Claims, 10 Drawing Sheets

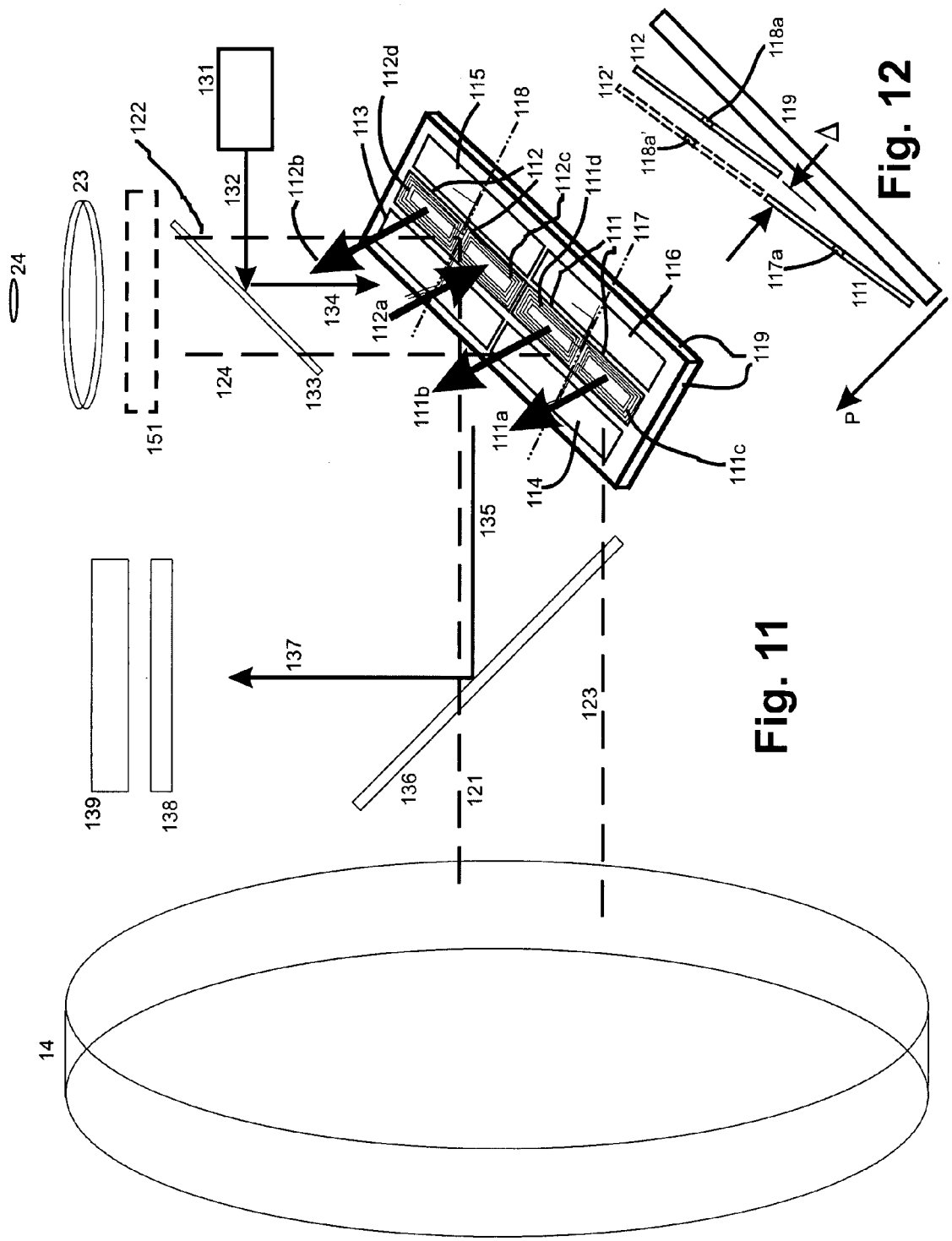

OPTICAL SYSTEMS AND METHODS USING MICROELECTROMECHANICAL-SYSTEMS MIRRORS EXCEEDING THIRTY MICRONS

RELATION BACK

Wholly incorporated by reference herein are coowned U.S. provisional patent application Ser. 60/433,301 filed Dec. 13, 2002; and PCT application US03/39535 based upon and claiming priority of that provisional application; and U.S. national-stage application Ser. No. 11/151,594 based on and claiming priority of the PCT application, and copending herewith. This is a continuation-in-part of '594 filed Jun. 13, 2005, now U.S. Pat. No. 7,297,934 application.

Other closely related documents are additional coowned U.S. utility-patent documents and references—also wholly incorporated by reference. Those documents are in the names of:

Kane, provisional application Ser. 60/381,286, also incorporated by reference in the provisional application that is mentioned above;

Kane et al., application Ser. No. 10/142,654 "HIGH-SPEED, LOW-POWER OPTICAL MODULATION APPARATUS AND METHOD"—and its three precursor provisional patent applications;

Kane and Potter, provisional application 60/601,015 dealing with lidar and MEMS phase and diffraction control;

Kane, provisional application 60/643,869 relating to a wavefront sensor; and

Campion, Dwork, Kane, Pohlman and Potter, provisional application 60/875,103 directed to diffraction control.

The priority benefit of all the above-mentioned cases is hereby asserted.

RELATED DOCUMENTS

Additional documents of interest and wholly incorporated by reference herein—though not coowned—are published application US2002/0171901 of Bernstein, assigned to Draper; and these four others assigned to Corning or to a Corning subsidiary: U.S. Pat. No. 6,989,921 of Bernstein, Taylor, Kirkos and Waelti; published application US2003/0202234 of Taylor and Bernstein; U.S. Pat. No. 6,760,145 of Taylor, Brazzle and Bernstein; and U.S. Pat. No. 6,778,728 of Taylor, Carlen, Mastrangelo and Bernstein.

FIELD OF THE INVENTION

This invention is very closely akin to that of my copending '594 application (already published as US 2006-0006337)—and the related others mentioned above—mainly diverging from them only in regard to the kinds of mirrors employed. That copending application and this present document both relate generally to systems and methods for automatically detecting light from an object, determining direction or other characteristics (such as distance, spectral properties, or an image) of the detected light or the object, and possibly responding to the detected light—and more specifically to such systems using microelectromechanical mirrors and an afocal optical element.

BACKGROUND

Some conventional systems and methods for accomplishing these goals rely upon scan mirrors that receive signals from an object and relay them into an aperture of an optical system—and, for response, conversely receive signals from the optical-system aperture and return those signals toward the object. Some such systems and methods instead (or also) rely upon large, mechanical gimbals that support and reorient the entire optical system. Both approaches entail relatively high moments of inertia, and accordingly large motors and elevated power requirements.

Such configurations require extremely adverse tradeoffs and compromises between, on one hand, undesirably high cost and size, and on the other hand structural weaknesses that lead to unreliability and even failure. For instance expensive custom parts and instrumentation are the rule rather than the exception, while some conventional devices have dimensions on the order of one to ten centimeters with mass of one to ten or even hundreds of kilograms.

These are significant handicaps for—in particular—devices that may be for use in airplanes and satellites. Even in these cases, such drawbacks might be acceptable if such systems provided superb performance, but unfortunately angular resolution in conventional systems of various types is generally no better than two-thirds of a degree—sometimes as coarse as ten degrees and more.

For example conventional macroscopic gimbal controls are most typically good to roughly one degree or less, although some units capable of precision in tens of microradians are available for millions of dollars each. Sensors using focal-plane arrays, e.g. quad cells, are typically precise to roughly ten degrees. Other nonmechanical systems include quad cells behind fisheye lenses.

The poor angular resolution and other performance limitations of such sensors arise in part from use of fixed, very large sensor assemblies, typically quad cells, CCD or CMOS arrays, at a focal plane—with fixed fields of view. These components accordingly also suffer from limited fields of regard. Furthermore the necessity for downloading into a computer memory the massive volumes of data from multi-megabyte sensor arrays makes the frame rate of these systems extremely slow.

In efforts to improve the field of regard, the large areal arrays are sometimes placed behind radically wide-angle lenses, even fish-eye lenses. This strategy, however, is counterproductive in that it only compounds the data-download problem, while also yielding intrinsically coarse angular resolution and very nonlinear angular mapping.

In other words these systems are squeezed between the need for high resolution and the need for broad field of regard; this squeeze comes down to an all-but-prohibitive demand for dynamic range, or bandwidth. Data congestion, furthermore, is doubly problematic because in these systems the entire contents of every frame must be retrieved before that frame can be searched for an optical source of interest.

One rather unnoticed contributor to inadequate dynamic range is the direct relationship between gimbal angle or scan-mirror angle and excursion of the beam in the external scanned volume. That relationship is a natural one-to-one for a conventional gimbal system, and one-to-two for a rotating mirror. Since the direct effect of mechanical rotation is relatively slow for conventional macroscopic gimbals, and relatively limited in overall angular excursion for scan mirrors, the external beam-angle excursion is either slow or limited, or both.

In attempts to mitigate low resolution and frame rate, some workers have proposed to substitute a so-called "position-sensing detector" (PSD) for the commonly used larger arrays. The advantage of a PSD—which is a unitary device, not an array—is that it inherently locates and reports position of only a detected optical source, not an entire scene, and thus requires download of only a far smaller amount of data.

Another inherent advantage of a PSD is that it provides a continuous, analog positional readout, intrinsically yielding extremely high resolution. The report from an array is instead quantized by the pixel (or "aliasing") effect that is central to any kind of array detection.

The PSD reports position on its own sensitive surface, in units of distance from its nominal center along two orthogonal axes. To find angular mapping, typically these off-center coordinates are divided by the focal length of a final focusing element.

Unfortunately these reported distances and therefore the angular mapping of a PSD are nonlinear, to the extent of several percent at the PSD edges—aggravating the analogous handicap introduced by a fish-eye or other wide-angle lens—and are also temperature sensitive. The detector may report accurately that an optical source has been sensed, but fail to report accurately where that object is, unless it is near the nominal center, or origin of coordinates.

It might be supposed—although in actuality this supposition is well beyond the present state of the art, and artisans of ordinary skill—that such a system could be quickly turned to look directly at the candidate object, for a more-accurate assessment of position. In any conventional detector, however, this solution is impractical due to the lumbering response of an associated macroscopic gimbal system, or even of a scan mirror that is redirecting the light into the detector aperture.

Often it is desirable to know something more about an optical source that has been noticed—the character of the light itself, and any intelligence signal that may be impressed upon that light. Accurate determination of wavelength and frequency modulation information, as may be gleaned from the foregoing discussion, is beyond the capabilities of these systems. Similarly infeasible is any exploration of physical objects that may be associated with the optical source.

The intractability of attempting to operate with such systems may be clarified by consideration of some practical situations which call for use of optical sensors. In most applications a person or an apparatus points a light source toward, most typically, some sort of vehicle—to guide an object in an attempt to rendezvous with the vehicle. Commonly the intention is adversarial, as for example damage to the vehicle; while the optical-sensor apparatus is mounted on the vehicle and its purpose is to detect the presence of the light beam and initiate some protective response.

Such response, usually intended to produce confusion as to the exact location of the vehicle, sometimes takes the form of returning a literally blinding flash of light toward the person or apparatus that is pointing the original source, to temporarily dazzle and confuse that source-controlling entity. Alternatively a response can be to eject from the vehicle many particles that strongly reflect the guide light, to instead confuse directional-control mechanisms of the moving object. Accompanying either of these may be an entirely different kind of response, namely an effort to disable the source-pointing person or apparatus, or the object. Such a disabling response, directed toward the object or source, may take the form of either a physical article or of powerful radiation. Still another desirable kind of response would be investigatory, i.e. determining the character of the guide beam or of the guided object; such information can be used to determine and report the nature of the guiding system itself, either for purposes of immediate efforts to confuse and avoid or for future protective-design work.

The person or apparatus pointing the source may be adjacent to the initial position of the object. In a sense this is the easiest case from the standpoint of protective response, because the source can be treated as a beacon for guidance of a disabling response that eliminates both the light source and the object—if the response is sufficiently prompt, so that the source and object are still not only in-line but also relatively close together. In another sense, however, this is a difficult case from the standpoint of confusion, because the object may have been designed to look (for its guidance) backward at the source rather than forward at the vehicle—in which event the ejection of reflecting particles cannot confuse the directional-control mechanisms of the object, as long as the pointing entity can keep the vehicle in view.

The person or apparatus pointing the source may, however, instead be at a different position—off to the side from the path of the object, and from a line between the source and the object. In this event, disabling both the source and object with a single response is not possible; but at least confusion can be more-readily produced since the object is necessarily designed to look forward at the vehicle, so that either the dazzling or the decoy-particle strategy, or both, can be effective.

One type of movable-mirror device that is known in various kinds of optical-detection systems is a single scan mirror of about 25 or 30 mm or more, consistent with the earlier statement of dimensions for conventional systems. Such mirrors are too bulky and heavy to overcome the above-discussed problems of response speed.

Another type of known movable-mirror device is a spinning cylinder with multiple mirrors carried on its outer surface. Such a polyhedral construction does provide a movable mirror, sometimes disposed along an optical path between a detector and an entrance aperture. Dimensions of each of the mirrors in such a device are typically in the tens of millimeters, also consistent with the previous indication of representative dimensions for conventional systems. Hence the overall device and even the individual mirrors are too big and heavy to free the optical-detection art from the response-speed and related limitations discussed above. These mirror wheels are ordinarily made to spin continuously; hence the individual mirrors of such an array lack independent maneuverability for customized control movements. Accordingly they are poorly suited for practical use in rapid detection and tracking of a particular source object.

Also of interest are telescopes—including astronomical telescopes—particularly of the type that has a movable mirror positioned between an entrance aperture and a detector. For present purposes, however, any interest in such devices is academic, as the movable components are huge and far too massive to be useful in any rapid-response system. Even more relevant is the typical limitation of field of view, in telescopes, to less than ten degrees.

Smaller deformable mirrors, too, are sometimes placed within optical systems in positions such as just described. A device of this type generally comprises a continuous reflective membrane that is controllably bent and distorted to correct wavefront errors. Such mirrors are typically at least 20 to 30 mm across.

Another type of known moving-mirror device is called a "microelectromechanical system" (MEMS) mirror. Such mirrors have never been associated with the field of optical-source detection that is under consideration here, heretofore. By "heretofore" I mean prior to the filing of my previous U.S. provisional '301 application mentioned above, and upon which this document is based.

Such devices, introduced some years ago by the Texas Instruments Company, and more recently in versions produced by Lucent Technologies and called an "optical switch", most commonly take the form of arrays of very small mirrors—each on the order of ten to 500 microns across. At least in principle individual mirrors can be made available in the same format. In use these devices, while some are capable of continuous positional control, are most often only bistable, used for switching in optical information networks and also in an image-projection system for personal computers.

My above-mentioned provisional '301 application, and the intermediate PCT and U.S. national-stage application, introduce use of one or more such mirrors. In describing such mirrors these applications, and most particularly the U.S. national application, in most passages indicate that the mirror dimensions are limited to "a few millimeters"—or "merely by way of example, in a range from a few tens of microns wide to several millimeters or more". It is also said that "the most preferable tested embodiments use e.g. silicon scan mirrors in the range of 1.5×2.1 mm".

A New Generation of MEMS Mirrors

Those dimensional indications were based upon the specifications of suitable MEMS mirrors available at the time of that writing, which generally were piezodriven, electrostatically driven, or mechanically driven by piston mechanisms and the like. In the interim, patents and published applications have proposed much larger mirrors.

Although one such document suggests usability with lidar, it has not been suggested that these new devices be used in any configuration known in the above-defined "Field of the Invention" or, more particularly, set forth in my above-noted precursor patent applications—e.g. with the mirror or mirrors internal to the optical system or with field of view magnified. One physical system using such a large mirror in a configuration external to the optical system has been built, but such a configuration is (apart from the large mirror) substantially conventional.

The larger units are as fast and precise as the earlier ones, but at the same time capable of even larger angular excursions. The improvements appear mainly due to use of magnetic rather than the earlier piezoelectric, electrostatic or mechanical drives.

Magnetic forces generally extend farther from the drive components, thus allowing larger mirrors with greater clearances—as well as lower voltages, and less rigidity in the force coupling from drive to mirror. Mirrors having these new properties furthermore can be optimized in several different ways, to increase optical-energy throughput, while at the same time—as set forth in this document—actually enhancing the effective resolution in imaging.

Some such ways are set forth in the previously introduced patent publications of Draper and Corning—most particularly an early dual-axis configuration having a fixed magnetic field at forty-five degrees to the two rotation directions, and generally aligned within the rest plane of the rotatable mirror. The exact origin of that configuration is not specified, but it is shown and described as "prior art" in FIGS. 2 and 3 of both the '921 patent and the '234 published application.

The same drawings are also presented in this present patent document as FIGS. 7 and 8 (after Bernstein, Taylor et al.) respectively. The moving parts of that device apparently are MEMS components, formed in place by now-well-known procedures of etching and forming microscopic elements from an initially single silicon wafer or substrate, or by silicon-on-insulator "SOI" procedures, or the like.

That evidently seminal two-axis geometry has a generally square mirror BT33 (FIG. 7) formed on a square pad BT32 between two torsional hinges or so-called "flexures" BT40, which are positioned at two opposed sides of the square pad. The ends of the flexures BT40 that are remote from the square pad BT32 attach to the inside edge of another square structure that is only a narrow frame, i.e. a square annulus BT34, so that the square mirror BT33 rotates about a first axis defined through its two flexures BT40 within the square annular frame BT34.

The latter frame, in turn, is mounted between two like flexures BT41 but at orthogonal positions, i.e., along edges of the square frame BT34 that are orthogonal to the positions of the two flexures BT40, first mentioned in the preceding paragraph, and the ends of these flexures BT41 remote from the square annular frame are mounted to inside edges of an outer square body BT35. These latter two flexures enable the square mirror BT33, and the square frame BT34 around it, to rotate together about a second axis—orthogonal to the first—defined through the outer two flexures BT41.

Accordingly the square annular frame BT34, with its outer square body BT35, is ingeniously made to function as a microminiature gimbal box. It provides rotation about two orthogonal axes, very generally as did the classical, mechanical gimbal boxes—but some three or more orders of magnitude smaller and faster.

Also formed on the front of the mirror pad BT32 (sharing that surface with the mirror BT33) and on the gimbal frame BT34 are numerous fine conductive traces BT36, BT38 respectively, which are disposed and connected to function as conductive coils. Electrical currents passing through these coils, via the flexures BT40, BT41 respectively, establish variable, controllable magnetic fields mainly oriented in and out of the plane of the drawing (and of the pad and frame)—that interact with the fixed field lines B to forcibly drive the mirror pad BT32 and gimbal frame BT34 in their two respective orthogonal rotations.

Although this two-axis MEMS mirror configuration appears to be a fully functioning single mirror, the Draper and Corning patent documents assert major improvements in magnetically driven MEMS mirrors. In particular the '901 published application preserves the same basic square geometry of mirror, pad and gimbal frame—with torsional flexures positioned (in almost all its embodiments) along the sides of the square.

One of its principal areas of improvement is in making a much greater fraction of the pad space available for reflection of optical energy by the mirror, simply by forming the coils on the back face of the pad rather than on the reflective mirror face. This change enhances the intrinsic size benefit of magnetically driven MEMS mirrors. The '901 document further exhibits such coils of many different configurations—spirals, loops etc.—for a variety of purposes.

A second main area of advancement in the '901 application is in orientation of the stationary magnetic field perpendicular to the rest plane of the mirror, rather than in that plane. Yet a third refinement is in ganging large numbers of the magnetically driven mirrors together, to form an array capable of complex switching tasks—or, alternatively, capable of operation with plural or multiple mirrors working in common to steer optical beams of large cross-section.

One of the many drawings in the '901 application shows flexures in the corners, rather than along the sides, of the square mirror pad and square gimbal frame. That application, however, does not make much of a point of this divergent geometry.

Thus it is left for the '921 patent to elaborate such a point, namely that corner placement of the flexures leaves a much greater fraction of the mirror-pad area available for oval or round mirrors. These mirrors are accordingly able to reflect much larger laser (or other) light beams of oval or round cross-section, for the same size mirror pad.

(More generally the '921 patent explores multimirror options and coil-configuration variations. By contrast the '901 application focuses mainly upon the basic superstructure of torsional mirror and gimbal-frame suspension etc.)

Many additional important optimizations are featured in the '921 patent, including stacks of coil layers, on both faces of the mirror pads rather than only the reflective face. Such geometry yields not only larger currents and larger magnetic fields—and therefore greater torque and more-nimble acceleration—but also far more-complex control capabilities. Some of the coils are counterwound relative to one another.

Some coils are disposed on just e.g. half of the movable pad area, paired on opposite sides of the rotational axis—as, for example, in FIGS. 8A, 8B of the '921 patent, reproduced in this document as FIGS. 9 and 10 (after Bernstein, Taylor et al.) respectively. As will be seen in later sections of this document, such separable coils BT76, BT78 (FIG. 9) and BT84, BT86 (FIG. 10) may offer special benefits for present purposes. Of course no such suggestion appears in the '921 patent under discussion.

More generally, the several above-outlined variations in coil geometry better exploit the directionality of the magnetic energy, actively twisting the pad about its flexures to still further increase the agility of the pointing function. These several new features are also combined to achieve a highly efficient use of the overall space and distances within an array of these mirrors—or in other words a high so-called "fill factor".

Fill factor is sometimes defined as a ratio of aggregate area of the reflectors to overall area of the array. An alternative figure of merit is a "linear" fill factor, defined as aggregate linear dimension of the reflectors (along one or another direction of the array) to corresponding overall linear dimension of the array.

This '921 patent also adds a system for detecting and measuring mirror position—using the same coils that drive rotation—by introducing onto the coils a high-frequency carrier that is then modulated by angular offset of the mirror- and gimbal-frame-mounted coils. Electrical filters separate the high-impedance positional modulation, carried at the high frequency, from the high-power drive signals.

Furthermore the '921 patent teaches that the permanent magnets and the coils can be reversed in position—i.e. placing the magnets on the backs of mirror pads, and the coils on the stationary base. The patent also describes noteworthy benefits of such new configurations.

Yet another group of significant refinements is introduced by the published '234 patent application. These include a different approach to raising the mirror fill factor: here each mirror pad carries a "lid" that overhangs the gimbal frame—and if desired also overhangs the surrounding stationary outer square body mentioned above.

Each mirror is formed and sized to match the oversize lid, rather than only the internal mirror pad. As a result the mirror dimensions are not at all limited by those of the pad or even the gimbal frame. The '234 application asserts fill factors as high as "about 80% or higher (e.g., about 95%)"—which represent phenomenal improvements.

This overbite approach to fill-factor enhancement appears to be an elegant solution. These advances, as well as the fill-factor improvements of the '921 patent noted earlier, naturally are importance only for applications suited to mirror arrays, as distinguished from individual mirrors.

The '234 application also further develops the theme of permanent-magnet placement on the moving-mirror pad, rather than associated with the underlying base. Alternatively in its FIG. 7 the '234 patent still further teaches, perhaps somewhat radically, mounting the variable-current coils and a stationary permanent magnet together—in the base, below the moving mirror.

There the stationary coils generate magnetic-field contributions that augment or partially oppose the fields of the intimately adjacent permanent magnet. In this scheme only a thin piece of magnetically passive soft metal is mounted to the moving mirror, providing enough magnetic reluctance to interact with the permanent and variable magnets in the base and thereby activate rotation of the mirror. Neither a permanent nor an active variable magnet need ride on the mirror.

The remaining Taylor-Bernstein patents principally address details of making and positioning coils, and flexure geometries to optimize linear fill factor, in multimirror arrays. They may have application in those of my inventions that are amenable to use of multimirror arrays.

Again, use of these larger mirrors in the environment of my present and related inventions is not suggested in the known art.

Afocal Lenses

Another familiar optical device not heretofore associated with the present field, are afocal lens packages used e.g. as lens focal-length extenders. These are commonplace in ordinary cameras.

Almost all the optical devices discussed above, and most conspicuously the astronomical ones and MEMS devices, are known only in different fields from the present invention.

As can now be seen, the related art fails to resolve the previously described problems of the above-defined "Field of the Invention"—most particularly slow tracking, small steering-mirror dimensions leading to low signal-to-noise ratio and therefore limited pointing precision and accuracy, and overly constrained field of view. The efforts outlined above, although praiseworthy, leave room for considerable refinement.

SUMMARY OF THE DISCLOSURE

The present invention introduces such refinement. The invention has several major facets or aspects, which can be used independently—although, to best optimize enjoyment of their advantages, certain of these aspects or facets are best practiced (and most-preferably practiced) in conjunction together.

In preferred embodiments of its first major independent facet or aspect, the invention is an optical system for dynamically determining radiation characteristics, including associated angular direction throughout a specified range of angular directions, of an external article in a volume outside the system. The optical system includes an optical detector and an entrance aperture.

It also includes an afocal element, associated with the aperture, for enlarging or reducing the field of regard ("FOR") of the external article and the volume as seen by the detector. This element is "afocal" in the sense that it does not, by itself, focus the external article onto any solid element of the optical system. (Such focusing, however, most typically may be performed by another optic or other optics elsewhere in the system.)

The system further includes at least one mirror for causing the detector to address varying portions of the volume outside the optical system. The "at least one mirror" is disposed along an optical path between the detector and the entrance aperture, and is rotatable about plural axes.

The specified mirror position, between detector and aperture, can also be described as "within" or "inside" the optical system. Each mirror of the "at least one" is a microelectromechanical mirror that has dimensions exceeding thirty microns.

Due to the enlarging or reducing of the FOR—together with rotation of the at least one mirror—the external article is visible to the detector throughout the specified range of angular directions, substantially without changing magnitude of said enlarging or reducing. That is to say, mirror rotation enables the detector to see external articles throughout the angular-direction range, even if the magnification or reduction provided by the afocal element is constant.

The foregoing may represent a description or definition of the first aspect or facet of the invention in its broadest or most general form. Even as couched in these broad terms, however, it can be seen that this facet of the invention importantly advances the art.

Steering the incoming radiation beam (i.e., maneuvering the sensitivity direction of the system) from within the system—and in particular from behind the afocal element—produces opportunities to obtain very large optical leverage, as compared with turning the entire system on gimbals or steering with mirrors external to the system. That is, the angle through which the beam outside the system turns can be made much larger than that through which the beam inside the system turns. (The latter angle is twice that through which the mirror turns.)

In addition the beam cross-section inside the optical system is generally smaller than outside. Hence smaller, lighter optical elements can be used, and this in turn means greater response speed with less power.

As mentioned previously, the examples of earlier optical systems using internal mirror positioning are so-called "nonanalogous arts". In other words they are not in the same field as the present invention.

Although the first major aspect of the invention thus significantly advances the art, nevertheless to optimize enjoyment of its benefits preferably the invention is practiced in conjunction with certain additional features or characteristics. In particular, preferably each mirror of the at least one mirror has dimensions in a range exceeding five millimeters.

It is more preferable that each mirror have dimensions in a range of ten millimeters and above. With such dimensions, a single-mirror can do the job of one or more entire arrays of the earlier, smaller MEMS mirrors—and without the complications of diffraction control using an array. Nevertheless, arrays of these larger mirrors are contemplated by my invention, and I consider them very highly advantageous.

Still more preferably, each mirror has dimensions in a range of twenty millimeters and above. Arrays of two or more such mirrors, with wavefront refinement for optimizing the diffraction limit, would provide extremely fine resolution, together with very high signal-to-noise ratio. Ideally each mirror has dimensions in a range from five to thirty millimeters.

Other preferences are that each mirror of the at least one mirror be driven, at least in part, magnetically; and that the at least one mirror include plural mirrors. When there are plural mirrors, preferably each is controlled in tip, tilt and piston; and more specifically controlled in piston by a respective magnetic drive that operates to stand that mirror away from a base or a rest plane of that mirror, by a variable distance.

Such a magnetic drive preferably includes magnetic coils disposed at opposite sides of a rotational flexure; and some means for electrically energizing the magnetic coils. Such means energize the coils generally independently, to substantially balance the mirror at a desired rotational excursion while standing the mirror away from the base or rest plane to achieve a desired piston excursion.

Another preference is that the optical system further includes some means for controlling rotational and piston excursions of each mirror to generally minimize relative optical phase of optical radiation reflected at the plural mirrors, including adjacent mirrors. In this case it is also preferable that the system still further include some means for detecting or adjusting, or both, the relative optical phase.

When detecting-or-adjusting means are present, they preferably include a wavefront sensor. Alternatively (or in addition) they also include an auxiliary optical path that generates and optimizes a point spread function based upon tip, tilt and piston settings of the plural mirrors.

When the system has excursion-controlling means, they preferably include some means for holding relative optical phase, of radiation reflected at adjacent mirrors, to modulo $2\pi$ radians within roughly plus-or-minus twenty percent of one wavelength. More preferably, for even finer diffraction limit, such excursion-controlling means hold the relative optical phase to modulo $2\pi$ within roughly plus-or-minus ten percent of one wavelength.

Another preference is that each mirror have dimensions in a range exceeding five millimeters; and that the afocal element be an afocal lens assembly disposed at the aperture, to magnify or reduce the varying provided by the at least one mirror. When present, such an afocal element is preferably disposed generally at the aperture.

As noted above, the afocal lens assembly—essentially by definition—does not focus the external article onto any solid element of the optical system. Preferably, however, the system also includes a focusing lens, associated with the detector. The focusing lens intercepts a radiation beam that has passed through the afocal lens assembly and that also has been reflected by the at least one mirror, and focuses rays, in the radiation beam, from the external article onto the detector. Also preferably the afocal element defines the aperture.

The optical system furthermore preferably includes one or more other modules, particularly such as:

a module for imaging, or spectral analysis;

a ranging laser and ranging-laser receiving module (distinct from the detector and focusing lens) for analyzing the ranging beam after reflection from an article;

a communication-beam transmission module that transmits a first modulated beam toward the article, and a corresponding reception module (likewise distinct) for receiving and interpreting a second modulated beam received from the article or a region that includes the article;

a powerful laser for projecting a beam to impair function or structural integrity of the article; and a laser for dazzling or confusing either a human operator or optical apparatus associated with the article, or both.

When the system does include one or more such modules, preferably they (and, where appropriate, the detector with its focusing lens) share the afocal element and at least one mirror.

In another group of preferences, if there is a detector with focusing lens, preferably the detector reports relative location of incident radiation on a sensitive surface of the detector. In this case the system includes some means for automatically responding to the detector by actively servocontrolling the at least one mirror to substantially center an image of a detected source on the detector.

Here, if the external article includes a radiation source of a particular type, the characteristics include existence and presence of the source. In this case the optical system is for detecting the source and determining its angular location, and the detector is a detector for radiation from the source of the particular type. In addition the system includes some means for automatically responding to the detector—by actively servocontrolling the at least one mirror to substantially center an image of a detected source on the detector.

Yet another preference is that the system include some means for reading and interpreting angular position from mirror position feedback signals while the image is substantially centered on the detector. Also preferably the responding means include some means for continuing to servocontrol the at least one mirror to track the already-detected source substantially at the detector center.

When the at least one mirror includes plural mirrors, the continuing means include some means for using one or more mirrors to track the already-detected source, and one or more other mirrors to instead simultaneously perform another function. Preferably the other function includes searching for another source, which is not yet detected. Another preference is that the other function include operating the auxiliary optical system with respect to the already-detected source or another article or scene.

When the system continues to track an already-detected source, the system also preferably includes operating a beamsplitter to enable use of an auxiliary optical system—with respect to the already-detected source or another article or scene—simultaneously with the continuing tracking. Other preferences are that the detector be a position-sensing detector (PSD), or a quad cell; and that the system include some means for substituting a detector array for the detector, to image the already-detected source or associated articles, or both.

As noted earlier, the system also preferably includes some means for directing a response toward the detected article or an article associated therewith, or both. The directing means include some means for emitting a beam of radiation that uses the entrance aperture as an exit aperture and is reflected from the at least one mirror; here the directing means share, with the radiation from the source, both the entrance aperture the at least one mirror.

In preferred embodiments of its second major independent facet or aspect, the invention is an optical system for dynamically determining radiation characteristics—including associated angular direction—of an external article in a volume outside the system. The optical system includes an optical detector, an entrance aperture, and an afocal optically powered element.

The afocal element is associated with the aperture, and modifies the field of regard of the external article and the volume as seen by the detector. (Most typically such modification takes the form of magnification or reduction.) The afocal element does not focus the external article onto any solid element of the optical system.

Disposed along an optical path between the detector and the entrance aperture, the system has at least one microelectromechanical-systems mirror, rotatable about plural axes. The at least one mirror is for causing the detector to address varying portions of the volume outside the optical system, with the enlarged field of regard produced by the afocal element. The at least one mirror has dimensions in a range greater than five millimeters.

The foregoing may represent a description or definition of the second aspect or facet of the invention in its broadest or most general form. Even as couched in these broad terms, however, it can be seen that this facet of the invention importantly advances the art.

In particular, use of such large mirrors—never before suggested in combination with internal beam steering through an afocal optic—enables far greater light-gathering power and thus signal-to-noise ratio. This is accomplished without significantly sacrificing rapidity of detection, or of positioning determination, and while maintaining precision and accuracy of pointing.

Although the second major aspect of the invention thus significantly advances the art, nevertheless to optimize enjoyment of its benefits preferably the invention is practiced in conjunction with certain additional features or characteristics. In particular, preferably the mirror is driven magnetically about at least one of the plural axes.

Preferably there are two or more mirrors, and they are each controlled in tip, tilt and piston. Preferably the mirrors are controlled in piston by a magnetic drive that operates to stand the mirrors away from a base or rest plane of the mirrors, by a variable distance.

It is also preferred, for each mirror that is so controlled, that the magnetic drive include magnetic coils disposed at opposite sides of a rotational flexure, and some means for electrically energizing the magnetic coils generally independently. This capability is exploited to substantially balance the mirror at a desired rotational excursion while standing the mirror away from the rest plane or base—to achieve a desired piston excursion.

Piston adjustment in turn, in combination with control of rotational excursions of the mirrors, is controlled to generally minimize relative optical phase of optical radiation reflected from the plural mirrors. For fullest benefit of this feature the system also preferably includes some means for detecting or adjusting, or both, the relative optical phase.

The detecting-or-adjusting means preferably include one of two alternatives: a wavefront sensor; or an auxiliary optical path that generates and optimizes a point spread function based upon tip, tilt and piston settings of the plural mirrors. The detecting-or-adjusting means are advantageously used to cause plural mirrors to operate not only at substantially the same steering angle but also at coordinated piston positions.

More specifically, it is preferable that the excursion-controlling means include some means for holding relative optical phase, of radiation reflected from adjacent mirrors, to modulo $2\pi$ radians. It is not necessary that this positioning be perfect; rather, for many or most purposes it suffices to hold the modulo $2\pi$ condition within roughly plus-or-minus twenty percent of one wavelength. Nevertheless, for finer imaging resolution and finer position-determining I prefer to hold the modulo $2\pi$ relationship to within roughly plus-or-minus ten percent of one wavelength.

Preferably the mirror dimensions are approximately ten millimeters, or greater. As mentioned earlier it is still more preferable that the dimensions be approximately twenty millimeters—or, yet more preferably, thirty millimeters, or greater. Several other preferences mentioned above in discussion of the first main facet or aspect of the invention are equally applicable to this second main facet.

In preferred embodiments of its third major independent facet or aspect, the invention is a method of operating an optical system. The system itself includes an array of magnetically controlled dual-axis rotatable MEMS steering mirrors, each of which has separate electrical coils disposed at opposite sides of a rotational axis, and at least one other magnet whose magnetic field interacts with magnetic fields created by the coils to produce magnetically generated forces.

The method includes the step of directing electrical currents to the separate coils of each mirror, to produce at least two components of magnetically generated forces. A first such component includes a pair of forces directed in opposite linear directions, applying torque to the respective rotatable mirror.

A second such component may be an additional variable net force tending to thrust the respective mirror outward from a rest plane of the array. This net outward thrust causes variable piston movement of the respective mirror.

Equivalently, and within the scope of appended claims, the mirror(s) can be pulled outward by any of several other forces, such as for example spring forces, or electrostatic forces, or even (in purest principle) gravitational forces—and the second component may be a net force tending to attract the mirror inward, toward the rest plane. Those skilled in this field will appreciate that combinations of these various specific arrangements are able to develop the same overall advantageous effects.

Another step is adjusting the at least two components of forces so that the steering mirrors direct a light beam in a desired substantially common direction—and so that light-beam wavefront portions from adjacent steering mirrors are substantially in phase to achieve a finer diffraction limit. As explained earlier, such a diffraction limit is conditioned substantially by the entire array dimension rather than an individual mirror dimension.

A further basic preference, in relation to both main independent aspects or facets of the invention, is applicable if the external article comprises an object or scene of interest, and the characteristics comprise distance data for different portions, respectively, of the object or scene, and the optical system is for forming the distance data. In this case preferably the optical detector includes a distance-determining receiver.

For background of such technology, and some other related technology, these patents and publications are wholly incorporated by reference: Griffis et al., U.S. patent application Ser. No. 10/426,907, "Compact economical lidar system"; Bowker et al., application Ser. No. 09/125,259, "Confocal-reflection streak lidar apparatus with strip-shaped photocathode, for applications at a wide range of scales"; and others cited therein.

Additional related documents are technical articles and pamphlets including: Philip J. Bos, "Liquid crystal based optical phased array for steering lasers", Kent State University, Presentation Materials; Brooker, Graham et al., "Millimetre waves for robotics" *Proc.* 2001 *Australian Conference on Robotics and Automation*, (Sydney; 14-15 Nov. 2001); and Bruce Winker, "Liquid crystal agile beam steering", Rockwell Science Center (Thousand Oaks, Calif.; Aug. 8, 2000).

This preference, involving distance information, encompasses a set of configurations that can be so-built at the outset. Alternatively they can entail substitution of the distance-determining device for a directionality detector during operation.

It is to be understood that the above enumeration of preferences is intended to be representative, not exhaustive. Accordingly many preferred forms of the invention set forth in the following detailed description or claims are within the scope of the present invention.

All of the foregoing operational principles and advantages of the invention will be more fully appreciated upon consideration of the following detailed description, with reference to the appended drawings, of which:

BRIEF DESCRIPTION OF THE DRAWINGS

FIG. 11 is a system diagram, highly schematic, showing aspects of my invention that incorporate one or more MEMS mirrors of the "new generation" discussed in the "BACKGROUND" section of this document (see related notes following this list);

FIG. 12 is a like diagram of two representative FIG. 11 mirrors in an end-to-end array and with the FIG. 11 base, but now seen edge-on and particularly shown with the mirrors rotated away from the common base angle (here forty-five degrees) by an arbitrary, illustrative amount (roughly nine degrees); and further with one of the mirrors adjusted also in piston, to a position 112' as shown in the broken line, for reasons explained herein.

None of the drawings is to scale.

Figure 7:
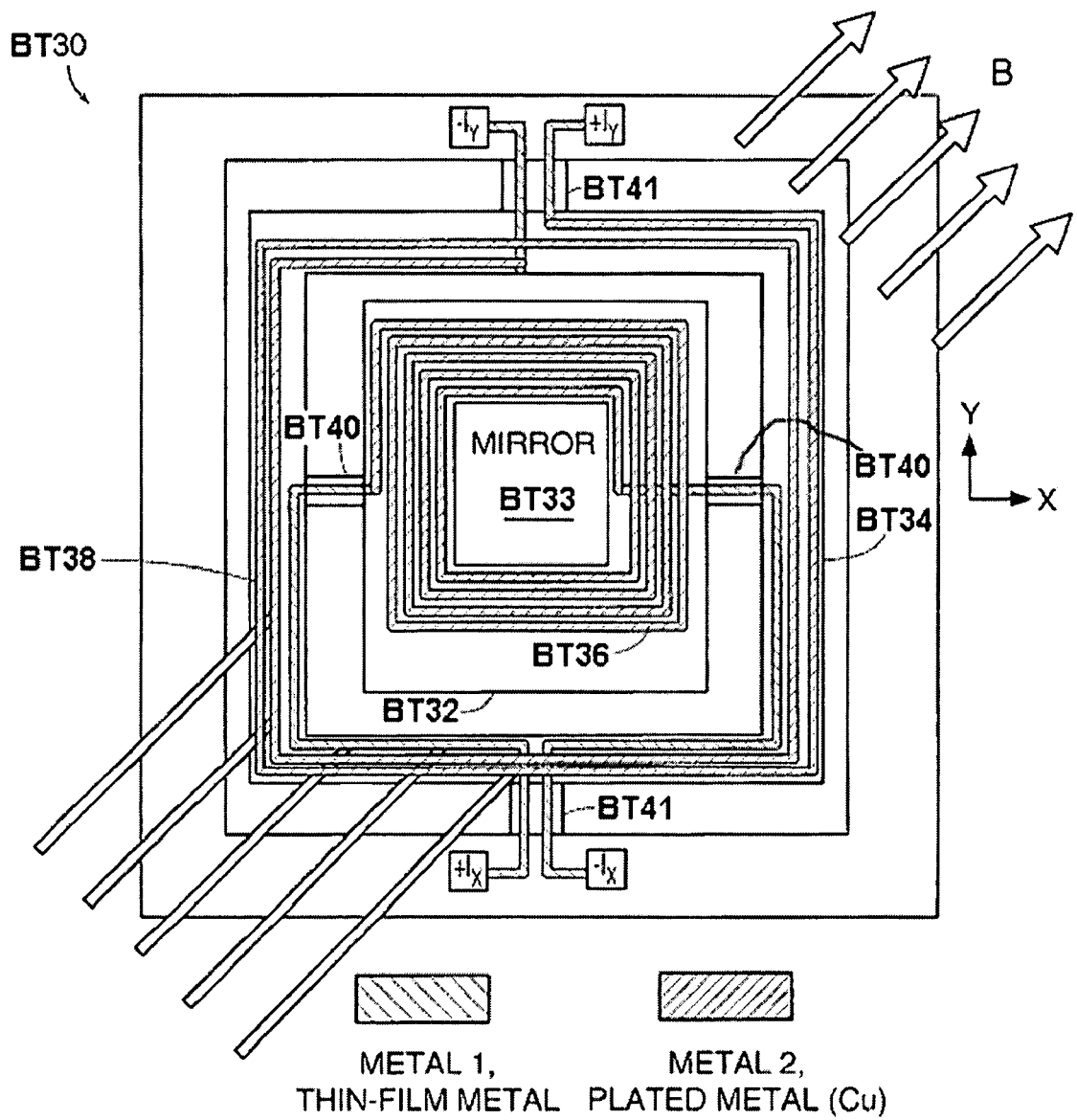
FIG. 7 is a detailed top plan, somewhat schematic, of a prior-art MEMS mirror assembly with integral gimbal system—and showing direction of a magnetic-excitation field (after the "prior art" FIG. 2 in the above-discussed '921 patent of Bernstein, Taylor et al.)
Figure 8:
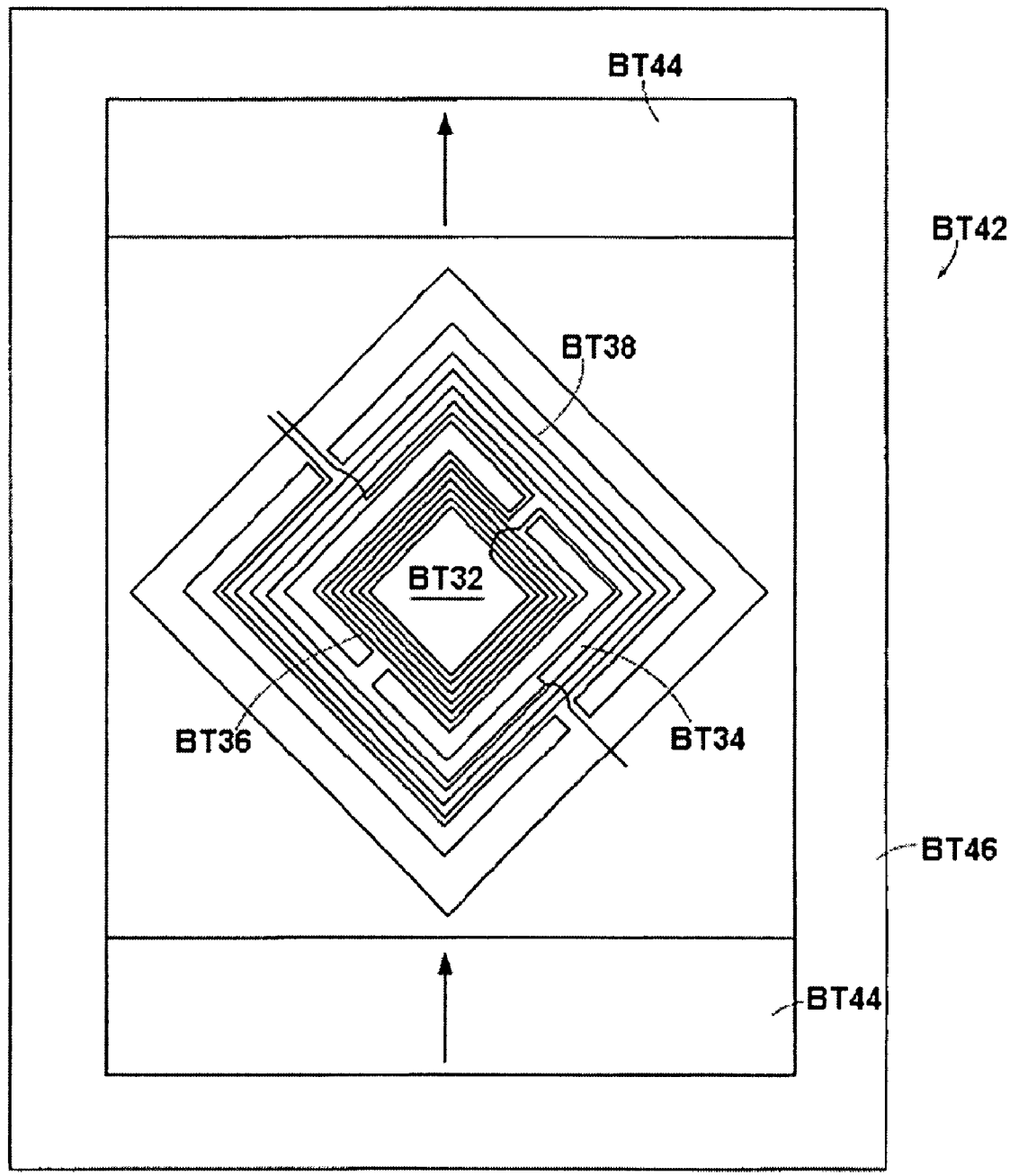
FIG. 8 is a simplified view of the same assembly, together with magnets for imposing such excitation (after "prior art" FIG. 3 in the same patent)
Figure 9:
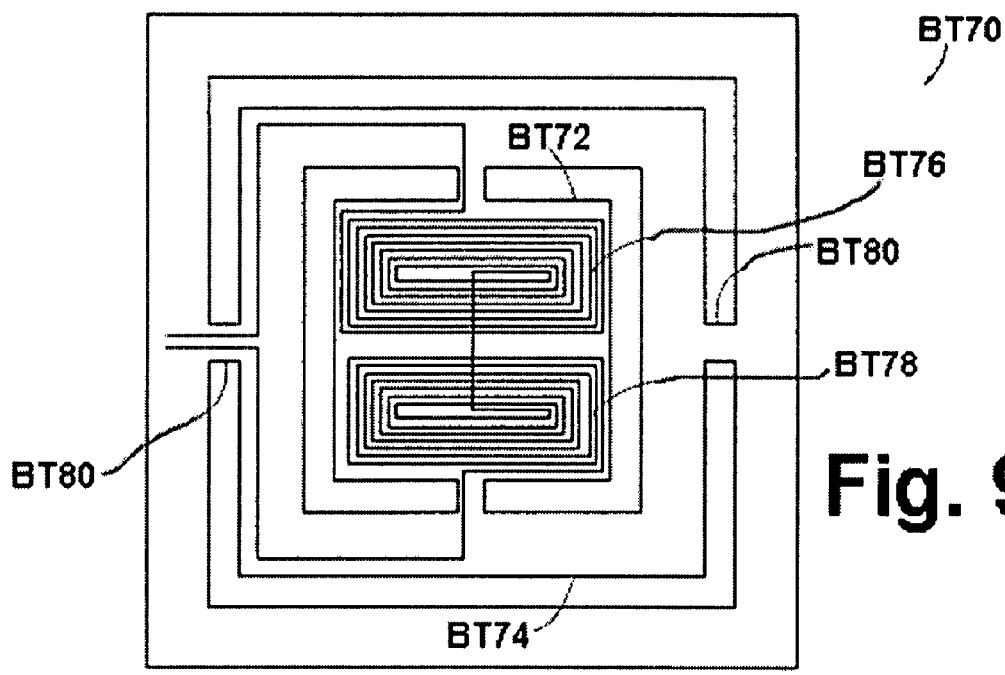
FIG. 9 is a like view, but of a first part of an embodiment of the invention that is taught in the '921 patent (after FIG. 8A in the same patent), having separate "X-axis control coils" on the mirror pad, at opposite sides of the horizontal flexure and associated rotation axis—and is prior art with respect to this present patent document, but not with respect to the '921 patent.
Figure 10:
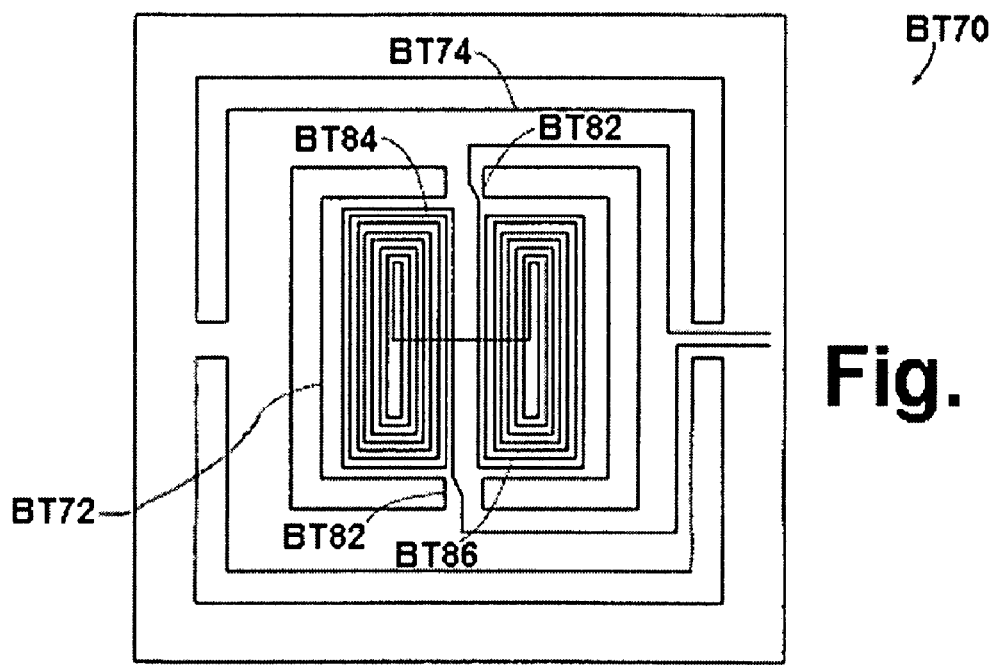
FIG. 10 is a like view of a second part of the same embodiment (after FIG. 8B in the same patent), but instead having separate "Y-axis control coils" on the mirror pad, at opposite sides of the vertical flexure and associated axis—likewise prior art with respect to this document but not to the '921 patent.

In FIG. 11, for the sake of simplicity, mirror control coils and resulting forces are explicitly illustrated for only a single axis of rotation. It is to be understood that the coils and forces are closely analogous for the orthogonal direction, just as illustrated in FIGS. 9 and 10 respectively. Preferably, however, one of the rotational directions is managed by use of a MEMS gimbal frame (not shown) surrounding the mirror pad and carrying coils for driving in that direction, as shown in FIG. 7 and discussed in the above-mentioned patent documents of Bernstein and Taylor. If desired, dual-axis rotation of a single mirror-carrying element can be substituted, as also described in those documents. FIG. 11 is meant to represent both these kinds of dual-axis implementation, and also several other system variants as more fully detailed below.

Thus portions of FIG. 11 are representative of a single electromagnetically controlled mirror 111 with a rotational axis 117; or equally well of an end-to-end two-mirror array 111, 112 with spaced-apart rotational axes 117, 118; or also equally well representative of a side-by-side two-mirror array 111, 114 with axis 117—or 112, 115 with like axis 118, etc.—or of a larger array such as the six-mirror assembly 111-116 expressly shown. In each case the coils e.g. 111c, 111d, in cooperation with magnets that may e.g. be in the base 119, provide respective forces 111a, 111b or 112a, 112b for rotation of the respective mirror(s) 111 etc. about the corresponding axis or axes and flexure(s) 117.

FIG. 11 also includes an auxiliary optical system 131-139 for purposes related to optimizing imaging sharpness, as detailed below. The drawing further includes a generalized element 151, which represents any of several supporting or utilization devices, or combinations of such devices, that are advantageously incorporated into the system. The possible devices are enumerated and discussed in following sections of this document.

DETAILED DESCRIPTION OF THE PREFERRED EMBODIMENTS

Figure 1:
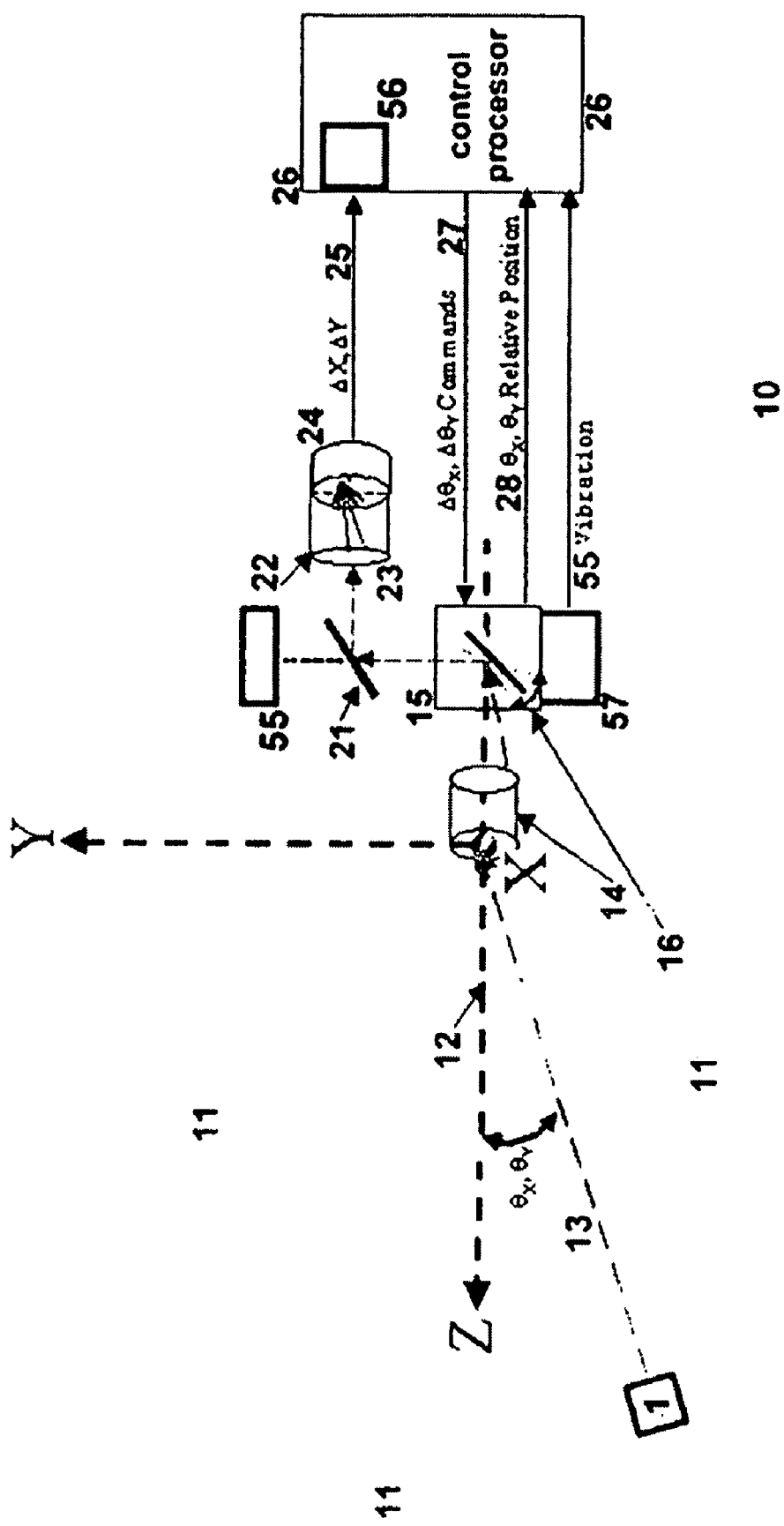
FIG. 1 is a block diagram, with most portions symbolically in side elevation but certain other portions (an aperture-lens assembly 14 and a lens/detector assembly 22) symbolically in isometric projection, of a basic first function—namely, a detection function—for preferred apparatus embodiments of the invention.
Figure 2:
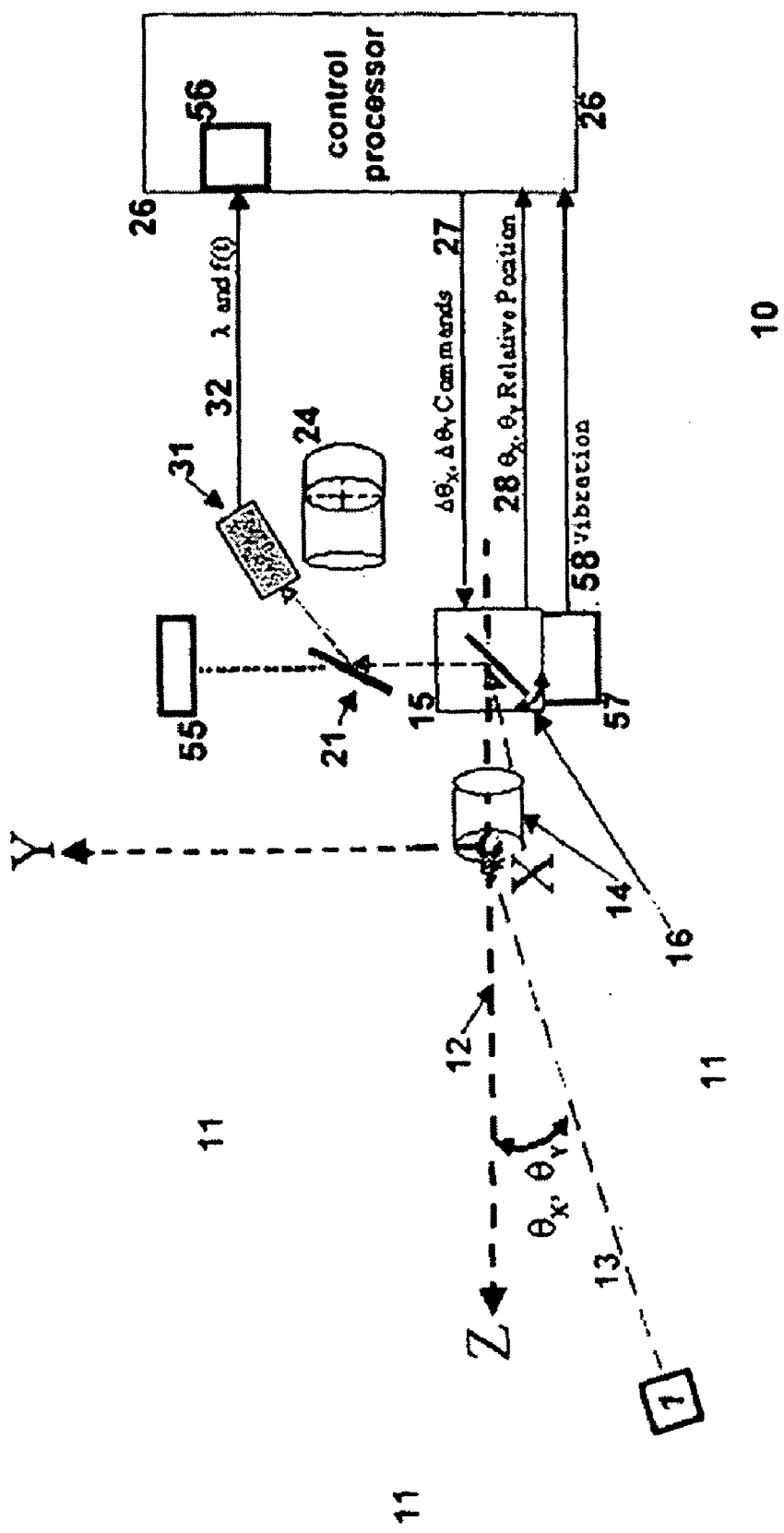
FIG. 2 is a like diagram showing an extension of the preferred apparatus embodiments to encompass a second function, namely optical analysis.

In preferred embodiments, the invention provides a low-cost sensor system 10 (FIG. 1) capable of detecting and locating active illumination sources—or objects illuminated by such sources. In some preferred embodiments (FIGS. 2 through 4), the sensor system of the invention can also respond to the detected light source by returning a light beam 38 (FIG. 3) or an object, and in some cases by initiating a distance-determining or other investigation (Function 4, FIG. 4) of the source or objects associated with the source.

In particularly preferred embodiments, initial detection of a radiation source or illuminated object is qualified by filters that implement expectations as to the characteristics of such sources or objects that are of interest. For instance, when anticipated sources are infrared, or are in other particular spectral regions, spectral filters are placed at convenient positions in the optical path—usually but not necessarily associated with the fold mirror 21, and in particular taking the form of bandpass optical reflection/transmission filters.

As mentioned elsewhere in this document, for various purposes the fold mirror can be advantageously implemented as a beam splitter, and incident-beam selectivity is simply an additional one of such purposes. In such arrangements, if it is preferable that certain spectral components of the beam not pass to the primary directionality detector 24, a dichroic or other bandpass or bandblocking filter can be used, as an alternative to a fold mirror 21. The filter transmits these undesired components to a radiation sink or auxiliary detection system 55, while reflecting the desired radiation components to the detector—or conversely, depending on preferred system configuration.

Such advance filtering is not limited to spectral characteristics. Merely by way of example, if anticipated sources are modulated temporally, the signal 25 from the optoelectronic detector 24 is advantageously filtered electronically 56 to exclude d.c. sources or sources having no significant bandwidth activity above a specific threshold frequency—or, more restrictively, to pass only a.c. signals having a particular specified modulation pattern or class of patterns.

Ideally the system detector 24 is a PSD, which has the ability to report positional coordinates $\Delta\underline{X}$, $\Delta\underline{Y}$ (on the PSD's own surface, FIG. 5) of an impinging optical beam from a source 1 in a region without the necessity of scanning the region. As noted elsewhere in this document, it is also necessary to determine the mirror position. From these data and known characteristics of the associated optics, as explained above, angular position $\theta_X$, $\theta_Y$ of the source is readily calculated.

As mentioned earlier, however, a PSD is nonlinear and temperature sensitive when measuring large off-axis coordinates $\Delta\underline{X}$, $\Delta\underline{Y}$ and thus angles $\theta_X$, $\theta_Y$. These drawbacks are neutralized, in preferred forms of the present invention, by operating in a null-balance mode as detailed below—so that the system relies on the PSD primarily only to determine whether the source is off axis and, if so, then in which direction; and not for quantitative reporting of large off-axis coordinates or their associated angles.

After the sensor system (including the arithmetic preprocessing mentioned earlier) has determined initial values for the incident angles $\theta_X$, $\theta_Y$, the system very rapidly servocontrols itself to keep incident rays 13 at the center of the detector field. Most preferably such servocontrol 27 is implemented by one or more microelectromechanical (MEMS) mirrors 15 disposed inside the optical system 10, i.e. along the optical path between the detector 24 and the collecting aperture 14, 45 (FIG. 5) of the system.

Such mirrors have extraordinarily low mass and inertia, and corresponding extremely high response speed—thus obviating the problem of sluggish response in earlier systems. Additional observations as to the new, larger MEMS mirrors appear later in this section. Placing the mirror or mirrors inside the system gains yet further advantages of angular displacement speed, in the visible volume 11 of space outside the optical system, particularly if a lens 45 is placed at the aperture to optically magnify the angular displacement of the mirrors.

This particular arrangement for servocontrol of the incoming light, to center the beam on the detector, is particularly advantageous when using a PSD. Whereas that type of detector measures large off-axis angles somewhat inaccurately, the system is easily made extremely accurate in measuring the angular correction 28 applied by the MEMS system to bring the source to the central, null position.

Throughout most of this document, for purposes of simplicity the notation "$\theta_X$, $\theta_Y$" has been used to represent both the off-axis angle of the beam 13 (FIG. 1) and the mirror-orientation 16 signals 28 relative to nominal or rest positions of the mirror or mirrors 15. As will be understood, these two different sets of angles 13, 28 are not at all the same—but when the system has servocontrolled itself to null the incident beam at the center of the detector 24, the two sets are related by straightforward transforms. Such transforms include the magnification factor introduced by the afocal package 14, as discussed at length elsewhere in this document, and also include the local calibration of the mirror actuator-stem positions relative to an internal standard, and also distortion in the afocal array 14 as well as the final focusing optic 23, and so forth.

The PSD itself can effectively monitor a far larger angular region 11 than it can image. This is a major advantage never fully exploited in conventional systems because of failure to use internal mirrors, or very small mirrors, and because of failure to servo the input source to a reproducible centerpoint on the detector.

Nevertheless a still further major advantage is gained by raster scanning 16 the PSD. The basic principle behind this is that the system views a small part of the field of regard at any instant in time, yet expands its coverage by searching for incident rays, thereby covering the entire field of regard 11. As will be seen, practical field of view using the various forms of the invention can range, representatively, from 20° to 180°.

This combination of the intrinsic angular-dynamic-range advantage of the PSD with the multiplicative advantage of a raster scan yields an enormous bandwidth, or bit depth, in overall determination of optical-source angular location $\theta_X$, $\theta_Y$. Moreover, once a light source 1 is detected and the MEMS mirrors operated by a processor 26 to center the source in the detector field, advantageously the processor sends the MEMS mirrors further signals to continue searching/scanning 16 in the general area of the detected rays—without losing the benefit of having the source near the detector center, where moderate angular accuracy is available. (Alternatively the native angular range of the PSD can be used for this purpose without additional mirror scanning.)

The optical system has been successfully servocontrolled to an incident ray when both coordinates $\Delta X$ and $\Delta Y$ (FIG. 5) of the ray on the sensitive detector surface are zero as measured by the two-dimensional ("2-D") detector assembly (or in the case of a 1-D detector, when $\Delta X$ or $\Delta Y$ is zero and the scan-mirror positions are noted). Once the system is servoing to the incident ray, as noted above it can function to determine not only angular location of the incident ray but also its wavelength $\lambda$ and coded temporal modulation f(t); or can direct similar or different light rays 35-38 (FIG. 3) opposite the incident rays 13 along the same path, or laterally 43 with respect to that path—for communications, distance determination, optical enhancement or other purposes. In the case of light rays received from an adversary for guiding an object with destructive intent, an auxiliary laser 42 can be directed 41 to emit a very bright beam 43 of identical wavelength $\lambda$ and temporal modulation f(t) onto a nearby (but progressively diverging) surface. This arrangement can closely mimic the original beam but in a different guiding location, and thereby draw off the object from the intended destination.

Various arrangements can be used to bring the auxiliary laser into optical alignment. One such arrangement is a variable-position fold mirror 21, 21' (FIGS. 2, 3 and 5); however, for simultaneous operations as noted earlier such a mirror can be replaced by a beam splitter, e.g. a polarized one for maximum radiation transfer, or by spectral-band-wise splitting devices such as dichroic filters.

Figure 4:
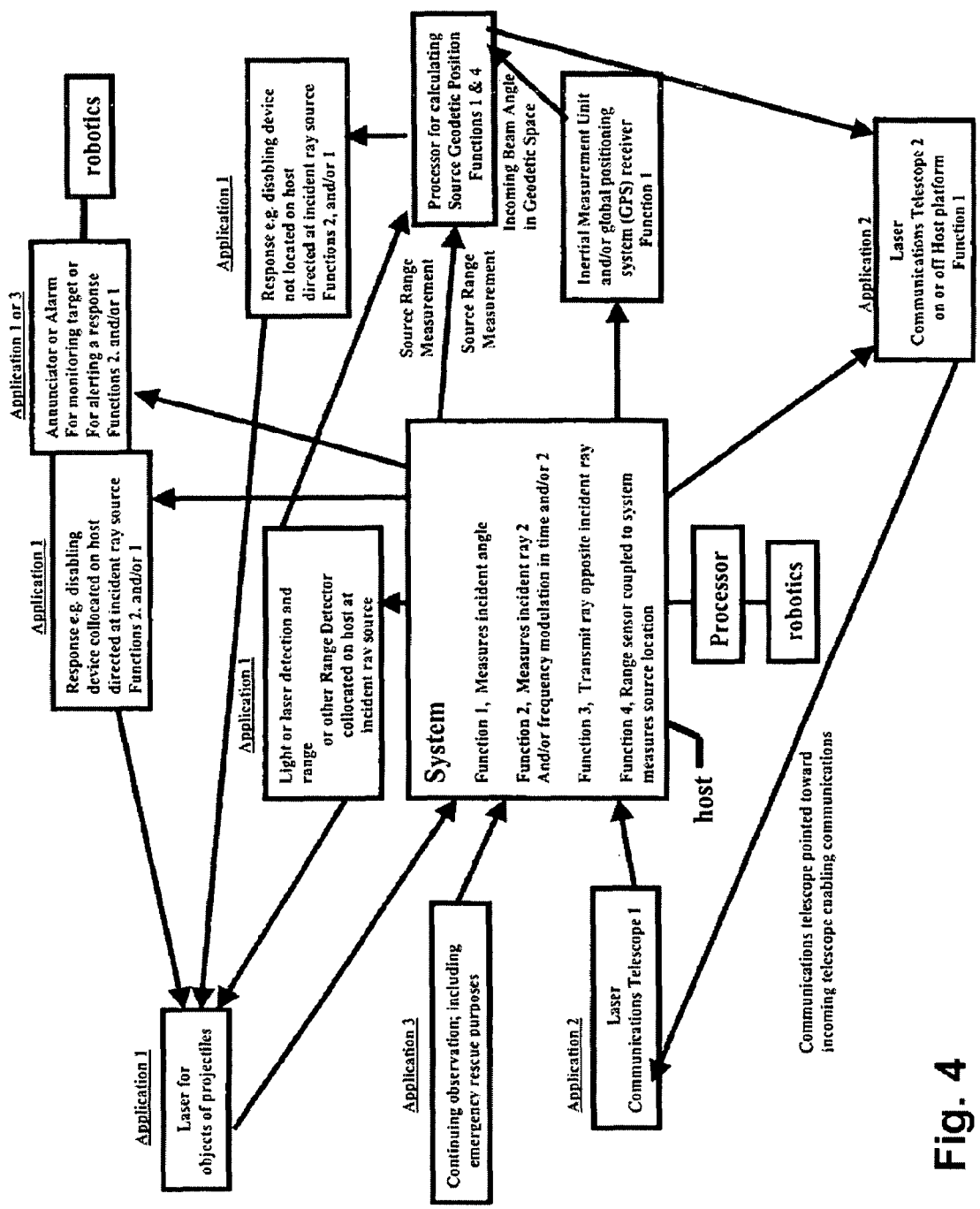
FIG. 4 is a multiapplication block diagram representing apparatus and procedures, using the apparatus embodiments of FIGS. 1 through 3 for the above-mentioned and still other functions, and in a number of variegated applications.

The sensor system is ordinarily located on a host (FIG. 4). An appropriate host is readily selected to optimize use of the invention for particular applications. In preferred embodiments, the host can be a vehicle including an automobile or truck, sea vessel, airplane, spacecraft, satellite or projectile, or even simply a human or animal or their paraphernalia. Hosts are not limited to these examples, but can basically consist of any carrier—even a stationary one—capable of supporting and maintaining the sensor, and exposing it to various kinds of articles or objects.

The sensor method or system specifications can vary and be optimized for use in particular applications. One of ordinary skill in the art can select preferred configurations of the system to suit a particular application. In preferred embodiments of the invention, the system can monitor a field of regard at approximately 10 Hz frame rate—evidencing the excellent sensitivity of the invention at high frequencies. The invention is capable, however, of monitoring in a range on the order of 1 Hz to 1 kHz—or even 10 kHz, depending on size of articles of interest, and the detector field of view. Overall, the invention provides a high degree of angular accuracy in determining the approach path of an incident ray.

Plural such sensor systems can be grouped and coordinated to provide up to $4\pi$ steradian coverage—i.e., for sensing in all directions at once. This kind of observation is appropriate for a host that is in the air or in outer space, and in some circumstances for a host that is waterborne. For a host on land, and for a water-surface-craft host in other circumstances (particularly, no need to monitor below the water surface) $2\pi$ steradian coverage ordinarily is entirely sufficient.

The sensor of the invention has the ability to monitor wavelengths ranging from ultraviolet (UV) to infrared (IR), particularly up to the midIR range.

Typically a MEMS mirror is limited in range to plus-or-minus ten to fifteen degrees about one or two orthogonal axes, i.e. through an overall excursion 16 of roughly 20° (FIG. 5) to 30° for each axis. In preferred embodiments of the invention, as noted earlier, a lens assembly 14 is advantageously used to significantly increase this range optically.

Most preferred embodiments of the invention eliminate the use of large external scan mirrors and macroscopic gimbals; as a result the invention is more rugged, and yet actually less expensive and several orders lighter and more compact than conventional sensor systems. For example, the size of the system, depending on the application, is on the order of one millimeter, or less, to a few centimeters—rather than on the order of one centimeter to tens of centimeters as described earlier for conventional units.

Prior to introduction of the new, larger MEMS mirrors introduced in the Bernstein and Taylor patent documents discussed above, dimensions of an oscillating scan mirror 15 could be, merely by way of example, in a range from a few tens of microns wide to several millimeters or more; such a mirror could be roughly square, or could have a high aspect ratio such as 25:1 or 50:1. Nominally and ideally, however, the aspect ratio was approximately the square root of two, since the mirror surface—when at the center of its range of excursions—is usually, or most conveniently, inclined at 45° to both the incident and reflected beams. These observations as to aspect ratio hold true for the new generation of larger, magnetically driven mirrors as well.

Accordingly, while the older mirrors in their most preferable tested embodiments were e.g. silicon scan mirrors in the range of 1.5×2.1 mm (note that $1.5\sqrt{2}=2.1$), the newer mirrors are advantageously 5 mm and above, in the shorter dimension, and $5\sqrt{2}=7$ mm and above in the longer dimension. The magnetically driven mirrors appear capable of construction up to (in the shorter dimension) preferably 10 mm, and more preferably 20 mm, and still more preferably even 30 mm or greater. The corresponding longer dimensions are respectively fourteen, twenty-eight and forty-two millimeters or more.

Again, these dimensions are not at all limiting. The earlier MEMS mirrors, as used in my invention, typically rotated about their own axes with excursion in the range of ±1° to ±10°—or even ±15° as previously noted.

The newer units, having a capability for greater clearance above the base as explained in the "Background" section of this document, are also capable of much greater angular excursion such as ±30°. Although this added mobility is quite valuable in the environment of my invention, the greatest advantages of the newer mirrors lie simply in their larger dimensions—as these very greatly simplify major increases (well over an order of magnitude) in optical-energy throughput, leading to corresponding advances in signal-to-noise ratio and diffraction limit.

Such improvement in diffraction limit pushes the imaging sharpness to excellent new values (namely, very fine resolution and imaging sharpness), as is well understood from classical diffraction analysis. Nevertheless these mirrors are also capable of assembly into a multimirror array having quite stunning overall optical-transmission area.

Furthermore such an array in turn is amenable to the diffraction-control techniques set forth in the related '015, '869 and '103 provisional patent documents mentioned earlier. These documents teach how to force such a mirror array to operate at the diffraction limit of a single mirror of the same overall size.

As set forth in my related patent documents, one way to achieve such enhancement is to use a wavefront sensor to directly measure irregularities in optical waves reflected from such an array—and then to refine the adjustments of all the mirrors in the array so that the mirrors all have (1) a common angle and (2) negligible relative-phase difference between adjacent mirrors in the array.

This second condition, negligible "relative" phase difference, allows overall pathlengths at the different mirrors to differ—but nevertheless eliminates phase degradation over the array by holding the differing adjacent pathlengths to very nearly $2\pi$ radians. Expressed in mathematical terminology, the pathlength differences at adjacent mirrors are "modulo $2\pi$".

As also set forth in the related documents, a second way to achieve the single-mirror diffractive effect is to provide an auxiliary optical path—that traverses the main-path mirror set—and test the sharpness of imaging with an auxiliary laser beam in that path. A preferred way of accomplishing this is to generate a point-spread function or "PSF" for the auxiliary beam, and adjust the mirrors in the array in such a way as to optimize the PSF. The result is again the modulo $2\pi$ relationship for adjacent mirrors.

As a practical matter, this condition is met adequately when the differences are within ten to twenty percent of one wavelength of modulo $2\pi$. This and other details are explained in the provisional applications just mentioned.

The system mass can be made just one-tenth to one kilogram, which is also generally several orders of magnitude lower than that of comparable known devices. Angular resolution is readily placed in the submilliradian or even tens-of-microradians range, i.e. less than three minutes of arc or even under one minute, versus the previously noted tens to hundreds of milliradians (two-thirds of a degree to tens of degrees) for sensors heretofore. Yet another major and remarkable advantage of the invention is that the system can eventually use off-the-shelf technology, requiring no expensive custom parts or instrumentation.

Initially, as noted in my copending precursor '595 application, the most highly preferred embodiments of the invention called for a custom MEMS mirror array of at least 5×5 mirrors—and more preferably 10×10 and even 30×30 mirrors—each individual mirror being at least 30 microns in the shorter dimension, up to at least 1.5 mm in that dimension and 2.1 mm in the longer, and with an afocal lens assembly that follows custom optical specifications but is otherwise conventionally fabricated. Using larger mirrors, 5 to 30 mm in the shorter dimension, it is possible to achieve substantially equal overall area with a much smaller number of mirrors—for example smaller in proportion to the square of the mirror linear dimension.

Since the linear dimension of the newer mirrors is typically greater by two to three orders of magnitude, the number of mirrors may be four to six orders smaller for the same collecting power. With this understanding, a previous mirror array of even 30×30 mirrors is equaled in area by less than one of the newer units. In short, one large mirror e.g. 111 or 112 (FIG. 11) potentially does the work of many previous, smaller mirrors.

Another approach to exploiting the potentially much greater size of magnetically driven mirrors, however, is to aim for a much larger overall steering-mirror area. For example, an array of 10×10 mirrors of the newer type comes to 100 times the collecting power of a single new mirror, and this in turn is six to eight orders' greater area than previously achievable. The result is enormously enhanced overall system performance, in terms of both signal-to-noise ratio and (assuming adequate provisions for diffraction control) imaging sharpness.

A representative array may for example comprise six such mirrors 111-116, for example with two parallel, spaced-apart unitarily formed flexures 117a, 118a (FIG. 12), and resulting rotational axes 117, 118 (FIG. 11). As will now be clear to people skilled in this field, an alternative is an end-to-end two-mirror array 111-112 with likewise parallel, spaced-apart rotational flexures 117a, 118a and axes 117, 118; or a side-by-side two-mirror array 111, 114 with flexures aligned end-to-end to produce one common-rotational axis 117—or a side-by-side, three-mirror array 114, 111, 116, likewise with a single common axis 117.

Skilled people in this field will further see that many other configurations are possible and usable, each with its own combination of advantages and tradeoffs. In the representative single mirrors 111, . . . 116, as well as the representative array 111-116, advantageously each mirror e.g. 111 or 112 is provided with coils 111c, 111d—or 112, 112d—that may be energized substantially independently to create respective magnetic fields, at the two opposite sides of the corresponding axis 117 or 118.

These created fields in turn interact with other magnetic fields (e.g. fields of permanent magnets that may be in the base 119, or elsewhere as described in the above-discussed Bernstein-Taylor documents) to develop separate magnetic forces 111a, 111b—or 112a, 112b—acting on each mirror at opposite sides of its rotational axis. In the case of oppositely directed forces 112a, 112b it is readily appreciated that the forces both urge the mirror 112 into rotation in a common angular direction, which may produce (all other things being equal) maximum torque and thus maximum angular-velocity response, for minimum electrical input power. Currently such a geometry and functionality appears ideal for, at least, a single-mirror system.

In my precursor application it was observed that then-favored component designs were expected to "quickly become standard in the field, and very shortly be available as commercial off-the-shelf units." In view of the new developments in MEMS-mirror technology, that observation must now be seen as unduly conservative—that is to say, the earlier designs have become not only standard but outpaced by the newer mirror configurations.

Most of the advances described herein, in practicing my present light-detecting, -characterizing and -response invention (i.e. in detailed construction and use of the invention) will be straightforward and clear, based upon the information in this document—considered together with the teachings of the other patent documents mentioned in the "RELATION BACK" and "RELATED DOCUMENTS" sections at the beginning of this document. One part of the present invention, however, may bear specific elaboration here, and that is the use of magnetically controlled MEMS mirrors to implement the fullest forms of diffraction control:

Piston Adjustment in a Magnetic MEMS Array

As made plain by my earlier patent documents, which are wholly incorporated herein, the control of diffraction to optimize imaging sharpness—with a MEMS mirror array—requires simply matching of certain adjacent-mirror conditions. Specifically, although matching the angles (called "tip" and "tilt" angles) of adjacent and nearby mirrors 111, 112 (FIG. 12) in the two rotational axes of the mirrors (only the "tilt" angle being shown) is critical for common pointing, and is also helpful to providing a partial smoothing of optical wavefronts, another kind of matching appears essential to complete diffraction control.

That kind of matching is along, roughly, the piston dimension P of the array. By "piston" I mean the positioning of a mirror in the direction P normal to the common base (and rest plane) of the mirror array.

Depending on the particular steering angle which the array is commanded to provide, the ability of the array to produce an essentially coherent reflected wavefront requires coordinated fine adjustment in the tip, tilt and piston directions—all three. This coordination is required to ensure that the modulo-$2\pi$ condition, mentioned earlier, is satisfied for the direction in which the reflected beam travels (or perhaps more accurately an average of the directions of the incident and reflected beams).

The need for some adjustment in the piston direction may be recognized from the distance $\Delta$ (FIG. 12) between the adjacent tips of the adjacent mirrors 117, 118. That distance may be conceptualized as measured along the true piston direction P (normal to the base and to the mirror rest plane), or alternatively along a normal to the common plane of the rotated mirrors.

Another preference is to measure it along the incident/reflected average direction mentioned above; and this is, roughly, the convention illustrated in FIG. 12. However measured, the distance $\Delta$ is in general disruptive to the required in-phase relationship of wavefront elements or "wavelets"—in the overall reflected beam—because that distance, in general, fails to be a multiple of one wavelength, or even close to such a multiple.

Without correction, therefore, the wavefront elements from those adjacent mirror tips must in general interfere with one another destructively, at least in part. Given such interference the diffraction limit for each mirror is determined, substantially, by the linear extent (in each principal direction) of that mirror considered individually.

The object, by contrast, is instead to condition the diffraction limit based upon the linear extent of the overall array. The well-known relationships of diffraction thereby provide a finer, sharper focus of each object imaged.

In purest principle, one way—which may perhaps be regarded as a "trivial" way, or alternatively as an extreme and very impractical way—to avoid or minimize partially destructive interference is to mechanically align the adjacent edges of the adjacent mirrors. In other words, one (or both) of the mirrors in theory can be moved to perfectly aligned positions 111, 112' (the latter being shown in the broken line).

Since the mirrors are at the same angle, such alignment (if possible) actually would cause the mirrors all to form one single reflective surface, and constructive interference would be guaranteed. What makes this approach impractical and extreme is that, in general, extremely large piston excursions would be required.

Fortunately it is not necessary to attempt such an approach. It is necessary only to bring the adjacent mirror edges into, approximately, optical-phase alignment—not mechanical alignment. As long as the wavefront elements propagating from the two adjacent edges are substantially in phase, the desired diffraction relationships obtain and imaging sharpness very greatly enhanced.

Within a typical mechanical interedge distance $\Delta$, for mirrors oriented at representative angles, most typically there are many hundreds or thousands of optical wavelengths. Therefore the number of opportunities to find a substantially in-phase relationship is typically an extremely large number.

By "substantially" in phase I mean wavefront elements in phase within about ten percent of one wavelength, which is part of a highly preferable embodiment of my invention. Even a twenty-percent phase error is usually or often adequate for a significant enhancement of image quality, and forms a somewhat less-preferable embodiment of my invention.

In summary, the piston-direction adjustment of e.g. mirror 112 need not at all appear as in FIG. 12, where that mirror has been moved by essentially the entire distance $\Delta$. A very tiny fraction of that distance generally suffices, and as already noted the alignment need not be exact.

In any event, it will be clear that, at least in general, wavefront coherence demands adjustment in the piston direction. The term "piston" here is particularly apt, in that most MEMS mirrors in the earlier generation of nonmagnetically controlled devices actually had a kind of mechanical piston component, i.e. an extensile rod element, that physically protruded or extended in, very generally, the dimension directly toward and away from the base (and rest plane) of the array, along the normal.

Accordingly "piston adjustment" referred literally to mechanically maneuvering that piston (or its connecting rod) for a net excursion inward and outward from the base. I say "net" because some MEMS-mirror configurations depend, in those earlier devices, upon operation of the piston or rod to achieve the tip and tilt adjustments too.

The interdependence of tip, tilt and piston controls persists in the current generation of MEMS devices, but in these devices the mechanisms of these adjustments are different. I shall now detail those new mechanisms.

It has been explained earlier that each mirror can have not just one but a pair of electromagnetic control coils 111c, 111d (FIG. 11)—or 112c, 112d—for forcing the mirror into rotation; and that passage of electrical currents through these coils in appropriate directions and magnitudes can—in effect—twist the mirror about the corresponding rotational axis. Here by the term "twist" I do not mean to suggest that the mirror is necessarily deformed in a twisting mode, but rather only that the whole mirror is bodily rotated by forces e.g. 112a, 112b applied separately at its two half-panels or lobes that are at opposite sides of the rotational axis 118.

Those forces 112a, 112b, when considered from the point of view of linear directions, are oppositely directed—but when considered from the point of view of torque about a central axis of rotation they are, generally speaking, operating in a common direction and additive. In other words, even though the two electromagnetic forces—assuming that they are oppositely directed in the linear sense—oppose each other in the linear sense and tend to cancel (to the extent that they are equal), they instead augment each other and tend to supplement each other in the rotational sense.

In this way the electromagnetic forces 112a, 112b adjust the mirror to a particular rotational balance point, a particular angle, that points the reflected or incoming beam (or both) in a particular direction—and also, as suggested just above, may be used to set the diffractive performance for a smoother wavefront.

Now, to the extent that those two oppositely directed forces are not equal, they do not cancel linearly; instead there is some residual of the larger one (e.g. 112b) of the forces that adds in the linear sense to the smaller one (e.g. 112a). In this case there is a net force in the (negative or positive) piston direction, so that the entire mirror is bodily drawn in toward the array base 119 or (as illustrated) thrust outward away from that base.

This net force and the resulting motion, and positioning of the mirror, toward or away from the base is in fact "piston adjustment". When such net force is opposed by other forces, such as for example a restoring force due to springiness of the rotational flexures used to enable rotation of the mirror, then adjustment of the net electromagnetic driving force results directly in a specific "piston" position, which can be calibrated.

If springiness in the flexures is not sufficient or suitable to produce this desirable result, then other sources of restoring force (even including counteracting forces produced electromagnetically, if desired) are readily provided—as will now be amply clear to people skilled in this field. It will now be clear to such people that the forces produced by electrical current through the respective coils, in their interaction with permanent magnets as discussed in the above-referenced patent documents, are readily adjusted in such a way as to achieve any desired or needed combination of tip, tilt and piston settings.

Another way to represent the rotational and piston forces is to show the two forces 111a, 111b acting on the two ends of a single mirror 111 as both pointing in a common linear direction (FIG. 11)—particularly, outward from the base. This conceptualization perhaps more naturally explains the piston suspension of the mirror outward from the base. With this fundamental arrangement, a controllable incremental difference between the two forces 111b, 111a serves to rotate or "twist" the mirror 111 about its rotational axis 117—once again producing a desired combination of piston, tip and tilt adjustments.

Setting array mirrors e.g. 111, 112 for approximate optical in-phase relationships as described above does require some basis for determining when two adjacent wavefront elements are, or are not, in phase—or, alternatively, determining when the overall system is as well tuned as it can be. My previously identified related patent documents describe how to do this.

A first way, also shown very generally in this present document, is to provide an auxiliary optical system 131-139, which in effect emulates the behavior of the main functional light paths through the overall system—but does so in a way that enables direct measurement and thus optimization of imaging quality. Thus a laser 131 directs an auxiliary beam 132 to a first beam-splitter 133, which in effect acts as a fold mirror, forwarding the laser beam 134 toward the mirror array 111-116 precisely parallel to the main optical path 121-122, 123-124.

After redirection (with, presumably, some wavefront distortion) by the array, the reflected beam 135 reaches a second splitter 136, and from it passes through a beam-conserving optical element 138—fully discussed in the coowned '103 provisional application—to an imaging detector 139. Focal elements (not shown) bring the laser beam 132, 134, 135, 137 to a focus on that detector 139.

The quality of that focus is developed as a so-called "point spread function" or "PSF". Thus the degree of perfection of the PSF as received at the imaging detector 139 serves as a figure of merit for the mirror-disposition adjustments.

Various algorithms enable perturbation of the mirror adjustments to optimize the PSF. This step is preferably performed for each of a great number of steering angles of the two-axis mirror array, and the results stored in memory so that the ideal adjustments can be very quickly and precisely summoned back for any particular steering-angle combination.

A second way to determine the phase quality of the mirror adjustments is to insert a wavefront sensor 151 directly into the main optical path 121-122, 123-124—as set forth in the coowned '015 patent document. Here the above-discussed auxiliary path 131-139 is omitted, and instead the wavefront sensor (typically including a sensor array) determines phase imperfections of the overall wavefront from the mirror.

In this case as well, the mirror settings can be perturbed according to any of various protocols, to optimize each part of the wavefront separately; or, alternatively, to optimize the overall quality in a more holistic fashion—as, for example, using a neural network. As with the PSF technique, such measurement is best performed as a function of the steering angles, so that optimized tip, tilt and piston settings can be automatically recalled as soon as a pair of steering angles is invoked.

The use of such magnetically developed forces 111a, 111b or 112a, 112b—or both—together with mirror-setting optimization apparatus 131-139 or 151, serves to enable a steering-mirror array 111-116 to achieve diffraction-limited performance corresponding to the dimensions of the entire array—and at the same time to very rapidly and nimbly canvass a broad field of regard, through a wide field of view. This is accomplished by the combination of large angular deflections of the steering-mirror array itself, further magnified by an afocal optic 14.

The optic directs light collected from external objects along an optical path 121, 123 to the mirror array, and thence along the further path 122, 124 to a focusing lens and then a detector 24. Various detector types are appropriate, depending upon the particular operations preferred—as set forth in other sections of this document.

Several other optical subsystems are advantageously incorporated into the system of my invention, individually or in combination. They are discussed in other parts of this document or the related documents introduced earlier.

Any such other subsystem, or any combination or subcombination of them, may be placed at an appropriate position e.g. 151 along the main optical path. Such a subsystem may be placed in advance of the focusing lens 23 and detector 24, or may be included instead of the lens and detector, or if preferred may have access to the optical path in parallel with the lens and detector, via a beam-splitter (not shown).

For instance such a subsystem or combination or subcombination 151 may include, without limitation:

(1) a wavefront sensor as mentioned earlier;
(2) a spectral-analysis module;
(3) a ranging laser for projecting a ranging beam to an object at unknown distance outside the optical system, and a ranging-laser receiving module, distinct from the detector and focusing lens, for receiving and analyzing the ranging beam after reflection from such an object;
(4) a communication-beam transmission module for transmitting a first modulated communication beam toward such an object, and a communication-beam reception module, distinct from the detector and focusing lens, for receiving and interpreting a second modulated communication beam received from the object or from a region that includes the object;
(5) a powerful laser for projecting a beam to impair function or structural integrity of such an external object;
(6) a laser for dazzling or confusing either a human operator or optical apparatus associated with such article, or both; or
(7) an auxiliary optical system that includes an imaging reception module, distinct from the detector and focusing lens, for receiving and interpreting an image beam received from such an object or from a region of such volume that includes such an object.

Preferably the afocal optic 14, and the mirror 111 (or array 111-116), are shared by the detector 24 with its focal lens 23 and by the subsystem, combination, or subcombination 151.

Figure 13:
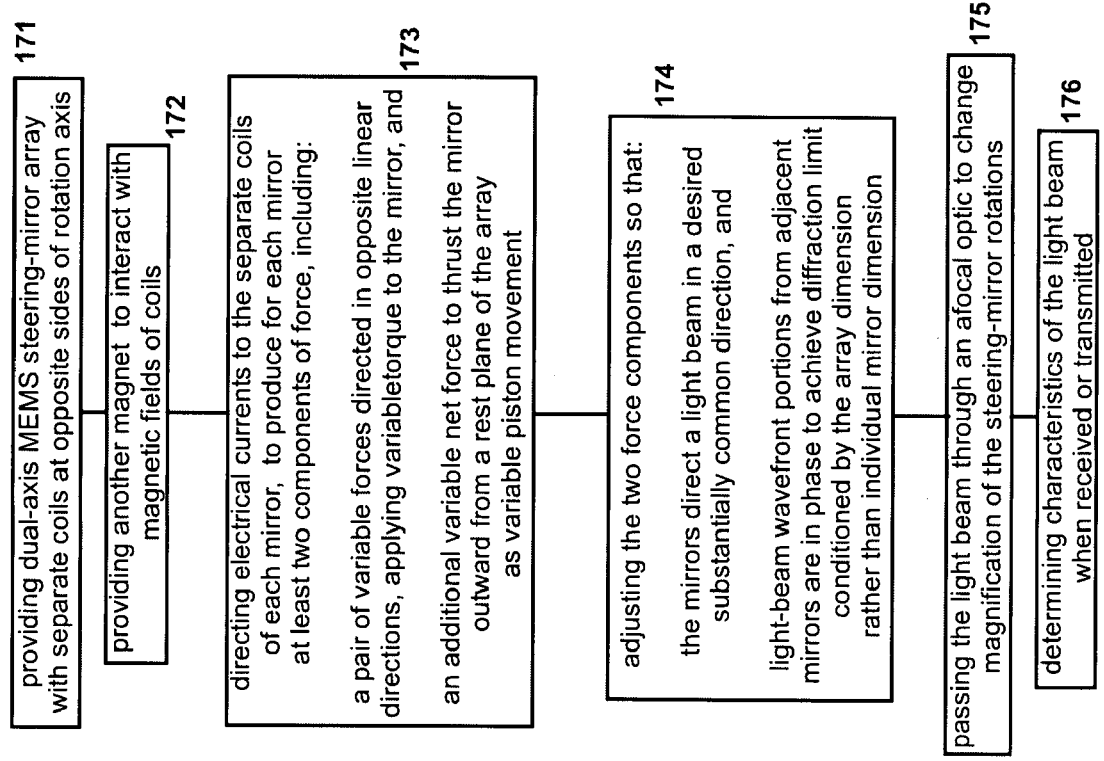
FIG. 13 is an operational flow chart, also highly schematic and showing methods—according to my invention—that also make use of MEMS mirrors of that same new generation.

From the foregoing discussion it will be appreciated that my present invention provides a new method of operating an optical system. The method includes providing 171 (FIG. 13) an array of magnetically controlled dual-axis rotatable MEMS steering mirrors. Each mirror is considered to have separate electrical coils disposed at opposite sides of a rotational axis.

The method also includes providing 172 at least one other magnet whose magnetic field interacts with magnetic fields created by the coils. The interaction produces magnetically generated forces.

The method further includes the step of directing 173 electrical currents to the separate coils of each mirror, to produce at least two components of magnetically generated forces, including:

- a pair of variable forces directed in opposite linear directions, applying variable torque to the respective rotatable mirror, and
- an additional variable net force tending to thrust the respective mirror outward from (or draw it inward toward) a rest plane of the array, causing variable piston movement of the respective mirror.

An additional step is adjusting 174 the at least two components of forces so that the steering mirrors direct a light beam in a desired substantially common direction, and so that light-beam wavefront portions from adjacent steering mirrors are substantially in phase. (Foregoing discussions explain how this is done, including ways of monitoring and responding to the wavefront or the imaging quality directly.) The result is to achieve a diffraction limit conditioned substantially by the entire array dimension rather than an individual mirror dimension.

As the preceding sections of this document make clear, this method has application in various functions, some of which receive light beams for analysis and others transmit light beams for imaging or other kinds of investigation. In either case, preferably another step of the method is passing 175 the light beam through an afocal optic to change magnification of the steering-mirror rotations. Still another step is determining 176 characteristics of the light beam when received or as (or after being) transmitted.

Often the several steps of this method are performed by respectively different people or institutions, or in respectively different locations or at respectively different times. The core steps of the method—steps performed once the full system is in place, but before the ultimate utilization steps (passing 175 and determining 176) may perhaps best be regarded as the directing step 173 and adjusting step 174.

Resolution, FOV, Dynamic Range, and Other Parameters

Remarkably, even though the present invention (including the form of the invention set forth in the copending precursor application) achieves far finer resolution than earlier sensors, at the same time it nevertheless also provides much broader effective field of regard. These dual advantages can be stated together in terms of an extremely high effective dynamic range.

The invention can redirect a new beam 43 (FIG. 3) of light (usually generated locally—i.e. on the same platform) laterally for guidance of any objects away from the host. The invention can also provide determination of wavelength λ and frequency-modulation information f(t) in the received beam, so that those characteristics of the received rays can be mimicked 41 in the new beam—which is relayed to another location, either for communications purposes or to lead an approaching object to a different destination. Alternatively the new beam can be directed back along the same path 38 as received rays 13, to the extent that the field of regard of the optical system (or of the system together with other such optical systems being operated in parallel) is broad enough to provide appropriate directions for the new beam. These capabilities are entirely beyond those of the prior art.

Figure 3:
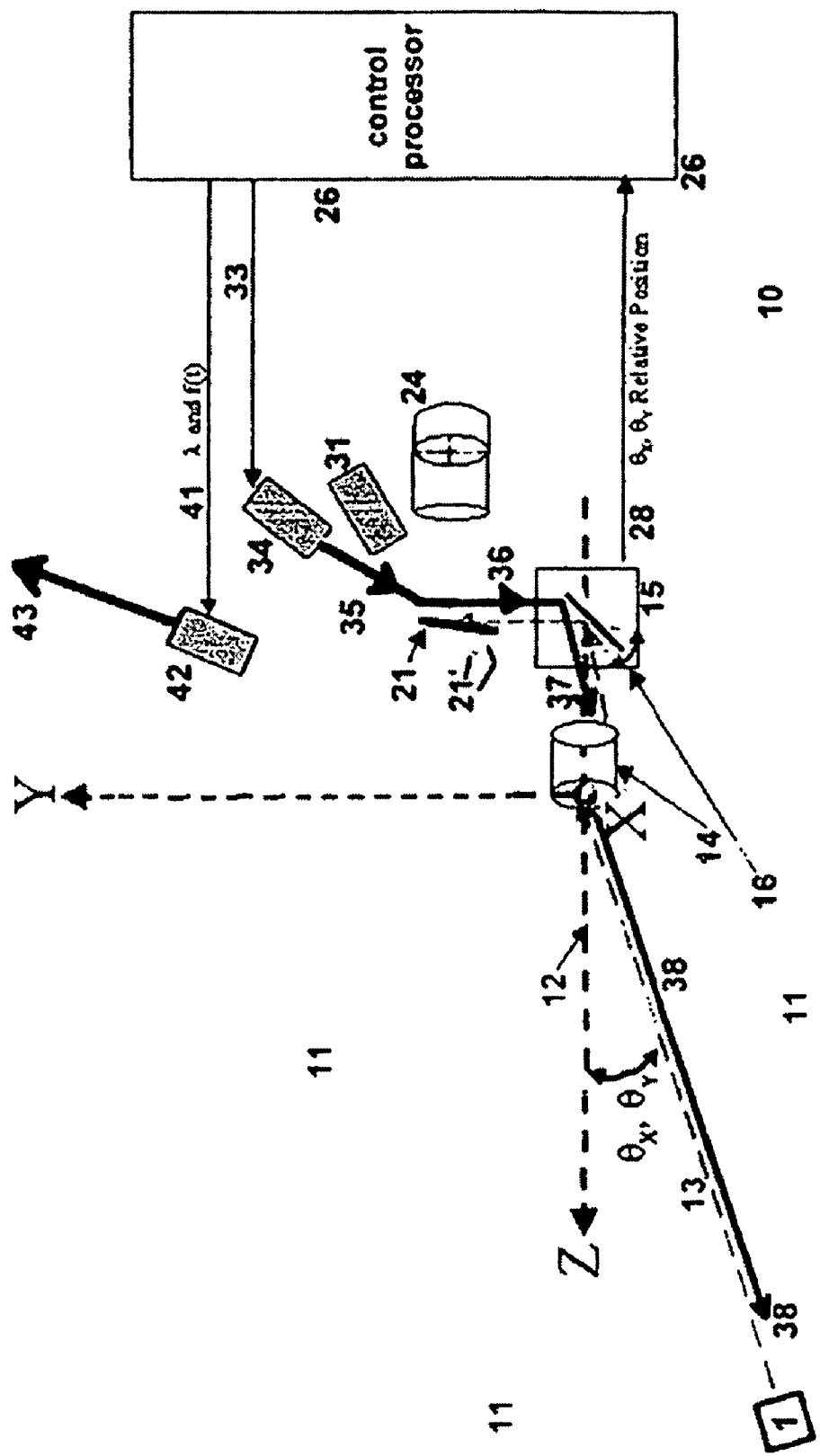
FIG. 3 is another like diagram but now showing a further extension to encompass dual forms of yet a third function, namely response.

Preferred embodiments of the method of the invention, corresponding to the apparatus discussed above, include the steps or functions of:

- detection and angular location of a light source (FIG. 1),
- determining characteristics of the received radiation (FIG. 2), and
- response (FIG. 3).

The first of these functions preferably includes these constituent steps:

STEP 1—Incident rays 13 from a light source 1 illuminate the system, on its host platform, at a relative angle $\theta_X$, $\theta_Y$.

STEP 2—An afocal lens assembly 14 reduces a collimated or nominally collimated incident or exiting ray angle, $\theta_X$, $\theta_Y$ (i.e., outside the optical system) by the ratio of the two focal lengths designed into the assembly, 1:3 in this example, resulting in much smaller off-axis angles of $\theta_X/3$, $\theta_Y/3$ inside the optical system 10—i.e. at the scan mirror or mirrors 15. This arrangement is optimal to effectively, or virtually, bring the incident rays within the native scan range of the MEMS scan system.

The lens assembly 14 is described as "afocal" because it is not used to focus the incoming rays directly onto the detector 24; rather the primary lens 45 forms (inside the lens assembly) only a virtual image 44, which the secondary lens 46 then recollimates—but only if the incoming beam 13a, 13 is itself at least approximately collimated—to produce substantially parallel rays in the beam approaching the detector assembly 22.

STEP 3—The MEMS scan mirror continuously raster-scans the field of regard. When the MEMS scan mirror intercepts laser energy at the corresponding original angles $\theta_X$, $\theta_Y$ (and reduced angles $\theta_X/3$, $\theta_Y/3$), the detector detects the energy and in turn transmits the signal to the control processor. The relative position reported at that same instant by the MEMS scan mirror assembly, and therefore corresponding to $\theta_X$, $\theta_Y$ is recorded by the control processor 26. To enable this result, a conventional two-axis angle sensor (not shown) that measures shaft angle of the MEMS mirror has been precalibrated to provide the corresponding field of regard angle ($\theta_X$, $\theta_Y$) relative to the optical axis.

STEP 4—The 2-D detector is fitted with a reimaging lens that focuses the incident beam at its conjugate location on the detector, relative to the system axis, provided that (1) the MEMS scan mirror is at an appropriate angle to direct the beam into the detector field of view, and (2) the incoming beam, within the envelope of extreme captured rays 13, 13a (FIG. 5), is collimated or very nearly so. This arrangement tends to somewhat diffuse the image of relatively nearby sources on the detector, and thus limit the response to light from relatively remote sources.

The detector is thus aided in essentially disregarding illumination from nearby sources, which for purposes of preferred embodiments of the present invention are deemed to be most-typically irrelevant. (As will be understood, contrary assumptions can be implemented instead, if desired, in other—generally conventional optical trains.) Such exclusion of illumination that is not of interest, however, is generally secondary in relation to other selective features in the system—e.g. spectral filtering 21, 55, and a.c. signal filtering 56 or other arrangements for enhancing sensitivity to anticipated known modulation patterns.

The position-sensing detector next comes into play, sensing not only presence of the illumination but also the displacements $\Delta X$, $\Delta Y$ of its focal point (conjugate location) from the optical axis—and generating corresponding $\Delta X$, $\Delta Y$ signals for transmission to the control processor.

STEP 5—Mirror-bias commands $\Delta\theta_X$, $\Delta\theta_Y$, proportional to the $\Delta X$, $\Delta Y$ values, are generated by the control processor and sent to the MEMS scan-mirror assembly. These signals drive the conjugate location approximately to the optical axis; and as that location approaches the axis the error signals $\Delta X$, $\Delta Y$ become progressively more linear and stable, by virtue of the inherent behavior of the PSD 24, so that the eventual determination of incident-beam location is extremely precise, accurate, and stable. At each instant the source angles outside the optical system are related to the coordinates on the PSD surface by the final-stage focal length, i.e. each angle $\Delta\theta_X$ or $\Delta\theta_Y$, equals the corresponding $\Delta X$ or $\Delta Y$ coordinate divided by the 2-D detector imaging-optic focal length $f_D$ (FIG. 5)—subject to the angle-scaling effect of the afocal assembly 14, discussed at "step 2" above.

STEP 6—The $\Delta\theta_X$, $\Delta\theta_Y$ incident-ray relative position as then measured by the MEMS scan-mirror local angle sensors are made available, for later functions, as an accurate line-of-sight location of the incident ray relative to the system axis.

The second function of the system basically includes determining the wavelength and any accompanying temporal or spectral modulation of the incident ray or signal. Continuing the above sequence:

Step 7—A fold mirror 21 (FIG. 2) rotates to direct the incident beam 13 to a spectrometer or photodiode 31. The fold mirror is basically a simple, motorized mirror that redirects light; but in other preferred embodiments this mirror can be replaced by a MEMS mirror or, as noted earlier, a beam splitter. One or more splitters, in tandem as appropriate, are particularly advantageous to permit simultaneous operations of different types, e.g. detection, spectral analysis, imaging, distance probing, or active response—and combinations of these.

Step 8—A spectrometer 31 determines the incident ray wavelength; and either the detector in the spectrometer acquires any temporal or spectral intensity or wavelength or temporal modulation to be detected and sent 32 to the control processor. Portions of this task may be assigned to the PSD 24, filter 56 (FIG. 1) and processor 26 for data acquisition during earlier steps 5 and 6.

The third system function is most typically an optical response that can take any of several forms. One such form (FIG. 3), which makes use of the directional information collected in the first function, is generation and projection of a very bright beam of radiation opposite the incident ray, to temporarily dazzle or confuse an operator or aiming-control apparatus at the source. Again continuing from the first-function sequence:

STEP 7—The fold mirror 21 (FIG. 3) rotates from its earlier positions 21' to align a powerful laser 34 along the optical axis, and thereby along the known path to the source.

STEP 8—The laser transmits a temporarily blinding beam 35-38 in a direction opposite the incident rays 13, but back along the same path, in response to a command 33 from the control processor 26.

A fourth function uses the information collected in the second function to generate and project a precisely wavelength-matched and temporal-modulation-matched beam to a nearby location, preferably one that progressively moves away from the host position, to draw any guided object away from the host. Friendly as well as hostile guided rendezvous can be facilitated in this way. This fourth function includes issuance of a processor command 41 (FIG. 3)—with necessary data $\lambda$, $f(t)$—to the auxiliary light source, e.g. tunable modulated laser 42. At substantially the same time the determined information is advantageously transmitted (preferably as interpreted, encoded data) to a remote station to document, e.g. for subsequent refined avoidance, what has occurred.

As will be understood, if the application at hand calls for directing a beam into the originally searched input volume 11, rather than a location laterally offset from that volume, then instead of the auxiliary laser 42 it is possible to use the previously mentioned laser 34—i.e., the one that can be aligned with the main optical path through the lens assembly 14. This option is particularly practical in the case of a plural-sensor-system apparatus configured to scan $2\pi$ or $4\pi$ steradians as previously discussed. In such applications essentially all locations are within the scanned range of at least some one of the component sensor systems.

A complex of other possible responses, and alternative applications of the information gathered in the first two functions, is within the scope of the invention (FIG. 4). One such response is initiation of a distance probe operation to collect additional information about any such object that may be associated with the beam, or about facilities at the source, or both. Several of the references cited at the beginning of this document provide very extensive information about distance-determining capabilities and design. Other ranging methods may be substituted as desired. This form of the invention can also be used for any of various other applications, such as for example transmission of modulated optical signals for free-space laser communications.

For each of the various applications additional components may be added, such as additional processing capability for further processing data, an annunciator for alerting an operator or connecting to an alarm for monitoring the system, or robotics for performing additional functions in response to the detection.

Particularly preferred applications, as shown, include use of the system in a vehicle or other host for detection of objects, or use of the system as a guide for a laser communications telescope—for which the system "communicates" angular, wavelength, frequency-modulation (or other temporal modulation) or other information between two telescopes. Also included is use of the system for continuous observation purposes such as recognition and location of emergency distress signals e.g. a beacon, or flares, or identification of approaching vehicles.

Furthermore the system can detect such light signals in outer space or even through large bodies of water. Thus objects can be identified and located regardless of whether they are floating in space, under the sea or on land. Other beneficial uses will appear from the drawing; however, it is to be understood that FIG. 4 is not intended to be exhaustive; i.e., not all functions of the invention described and discussed in this document appear in that drawing.

Because of the versatility of the system and its many functions, it has a wide range of applications spanning industries as diverse as telecommunications, optics, automotive, marine, aerospace, continuing observation, and search and rescue.

In a particularly preferred embodiment of the invention as set forth in the copending precursor application, the sensor system utilizes a two-axis scan mirror (FIG. 5) of dimensions 1.5×2.1 mm, with mechanical scan angle of plus-or-minus 10° to 15°—for a total excursion of 20° to 30°—about both axes. These various values, however, and related values elsewhere in this document, are preferably supplanted by those appropriate to the newer MEMS mirrors as detailed above. A two-axis scan mirror is not a requirement; a single-axis scan mirror with one-dimensional detector can be substituted. Using a two-axis scan mirror with a 2-D detector, however, allows greater flexibility in detecting throughout a volume or detecting in more than one dimension.

A ±10° or ±15° sweep 16, i.e. 20° or 30° full-excursion, of the MEMS mirror or mirrors 15 is doubled—by the effect of reflection—to produce a 40° or 60° deflection of the beam at that point. The MEMS system, in turn, is behind a lens assembly whose focal-length ratio (typically 1:3) triples that 40° or 60° deflection to provide, typically, a 120° to 180° overall field of regard. The two-axis MEMS scan mirror, operating at approximately four milliradians for approximately the magnification (again, typically three) times $2\lambda/d$, repeatedly sweeps the full 120°×120° volume at more than 10 Hz. This then is the frame rate for a complete scan of that field of regard.

If a collimated or nominally collimated incident ray is directed toward the host within this overall field of view, the ray is projected—through its reimaging lens—onto the detector when the MEMS two-axis scanning mirror is at the corresponding angular position. The MEMS scan-mirror control system then drives the scan mirror to maintain the incident ray on the detector, ideally a position-sensing photodiode detector as described earlier—and preferably at its center.

This detector provides positional closed-loop feedback to the scan mirror, driving the focal point to minimize the $\Delta X$ and $\Delta Y$ coordinates. In other words the beam is driven to the native origin on the photosensitive surface of the diode.

When in that condition, the angular positions of the mirror provide the corresponding azimuth and elevation angles $\Delta\theta_X$, $\Delta\theta_Y$ of the incident rays—based on the corresponding error coordinates $\Delta X$, $\Delta Y$ at the detector surface, and the corresponding known relative mirror angles as explained earlier. Limiting uncertainty of the input collimated laser-beam angle is the limiting resolution of the 2-D detector divided by the reimaging lens focal length $f_D$.

In addition to illuminating the PSD, the system advantageously includes a multiposition relay mirror (or fold mirror etc.) to alternatively direct the incident beam to other detectors such as a spectrometer used to determine incident-ray wavelength—or a beam-splitter to do so concurrently. If preferred, quad cells, focal plane arrays, or line arrays such as a charge-coupled device (CCD) or other light sensitive arrays can be used instead. Ideally each individual detector of an array can be provided with its own individual microlens. Nevertheless the previously mentioned quantization effect remains a concern, and array detectors are generally slower than PSDs, particularly when taking into account the necessary algorithmic procedures for readout and interpretation of optical signals.

The same multiposition mirror can also serve to route output rays, from an onboard laser or other bright lamp, back along the original optical path toward the source of the initially detected incident beam—to blind the source operator, or locate the source facility, or communicate with it, all as set forth earlier.

In practice of many of the preferred embodiments of the invention—but particularly for situations in which the system cannot lock on to an active source, usually because no active optical source is present or none is being concurrently detected and tracked—it is especially helpful to provide a vibration-sensing subsystem 57 (FIGS. 1 and 2) adjacent to the scan mirror or mirrors, and a correctional-data path 58 for flow of vibration information from the outputs of these sensors to the main processor. (Although included in FIG. 1, such provisions most typically are in order only when no positional detection is available, e.g. as in FIG. 2 with the detector 24 out of service, or absent. Vibration sensing 57, 58 and input filtering 55, 56 are omitted from FIGS. 3 and 5 only to avoid further clutter in those drawings.) This sensing module 57 with its correction path 58 enables a spectrometer, or an imaging system or distance-determining system, that is part of the invention embodiments to form a stable, high-resolution 2-D or 3-D image despite vibration in the host platform.

Most typically the vibration sensor includes a gyroscope or set of accelerometers, separated by known lever arms. These devices provide enough information—most typically with respect to five degrees of freedom—to enable the system to incorporate compensating maneuvers of its moving mirrors, canceling out the effects of such vibration. These devices should be augmented by a GPS sensor for geodetic coordinates Sensing elements 57 positioned along the plane of a supporting base of the moving mirror or mirror assembly 15 can for example include three linked accelerometers sensitive to motion normal to that plane, and two others sensitive to motion within that plane—ordinarily but not necessarily parallel to orthogonal edges of the base. Such vibration-sensing devices in effect define instantaneous characteristics of any host-platform vibration. Such sensing subsystems in themselves are well known and conventional. The data they produce must flow to the processor 26 and be interpreted promptly enough to enable effective feedback into the control circuits of the moving mirror or mirrors, to achieve cancellation within the desired imaging accuracy of the overall system.

Vibration sensing, like other functions involving detection of relative position as between the MEMS mirrors and the base or platform—when using the newer, magnetically driven mirrors—ideally may be performed through use of magnetic pickups, e.g. auxiliary coils built into the individual MEMS mirrors. This sensing strategy is particularly favorable for the same reasons that the magnetic mirror drive itself is advantageous, namely that action and sensing at a greater distance is practical with magnetism than with mechanical, electrostatic or piezoelectric phenomena.

Figures 5, 6:
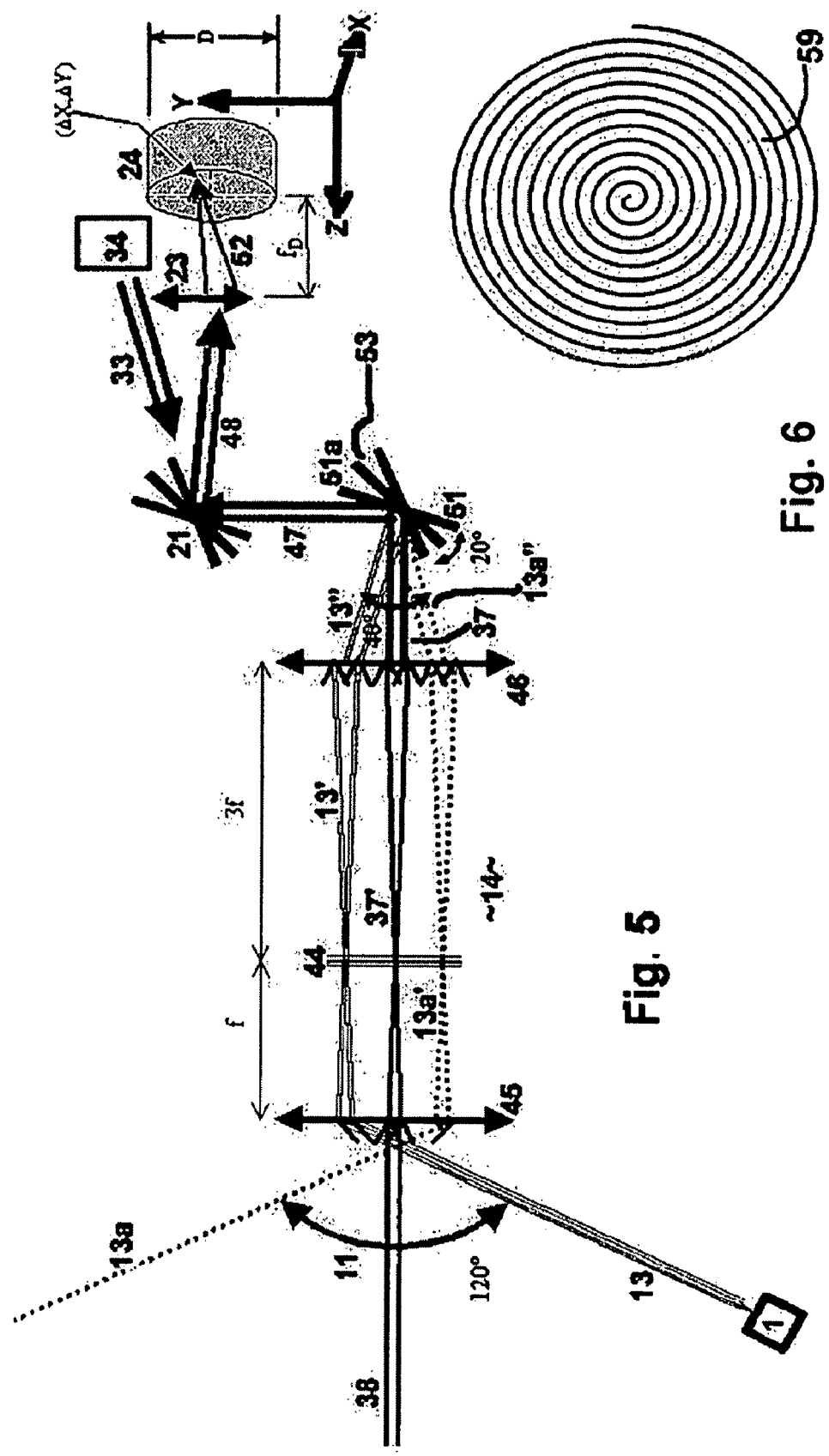
FIG. 5 is a diagram generally like FIGS. 1 through 3 but with the lens and detector assemblies 14, 22 enlarged for presentation of details.
FIG. 6 is a diagram conceptually representing a spiral-scanning raster pattern for use in any of the FIG. 1 through FIG. 5 systems and methods.

For most purposes of the present invention, as previously mentioned, raster scans are advantageously performed using a spiraling pattern 59 (FIG. 6). With moving mirrors, executing such a pattern is most typically far more energy-efficient and fast than tracing a more-conventional rectangular-envelope serpentine pattern. For optimum speed and efficiency the sequence reverses direction at each end—i.e., outward in one scan, inward in the next, and so forth. As in any raster operation, the number and pitch of the spiral revolutions should be selected with care to obtain good resolution without significant gaps in the image.

In accompanying apparatus claims generally the term "such" is used (instead of "said" or "the") in the bodies of the claims, when reciting elements of the claimed invention, for referring back to features which are introduced in preamble as part of the context or environment of the claimed invention. The purpose of this convention is to aid in more particularly and emphatically pointing out which features are elements of the claimed invention, and which are parts of its context—and thereby to more distinctly claim the invention.

The foregoing disclosure is intended to be merely exemplary, and not to limit the scope of the invention—which is to be determined by reference to the appended claims.

What is claimed is:

1. An optical system for dynamically determining radiation characteristics, including associated angular direction throughout a specified range of angular directions, of an external article in a volume outside the system; said optical system comprising:
   an optical detector;
   an entrance aperture;
   an afocal element, associated with the aperture, for enlarging or reducing the field of regard of such external article and such volume as seen by the detector; and
   disposed along an optical path between the detector and the entrance aperture, at least one mirror, rotatable about plural axes, for causing the detector to address varying portions of such volume outside the optical system;
   each mirror of the at least one mirror is a microelectromechanical mirror having dimensions in a range exceeding thirty microns;
   wherein, due to said enlarging or reducing of the field of regard together with rotation of the at least one mirror, such external article is visible to the detector throughout the specified range, substantially without changing magnitude of said enlarging or reducing.

2. The optical system of claim 1, wherein:
   each mirror of the at least one mirror has dimensions in a range exceeding five millimeters.

3. The optical system of claim 1, wherein:
   each mirror of the at least one mirror has dimensions in a range of ten millimeters and above.

4. The optical system of claim 1, wherein:
   each mirror of the at least one mirror has dimensions in a range of twenty millimeters and above.

5. The optical system of claim 1, wherein:
   each mirror of the at least one mirror has dimensions in a range from five to thirty millimeters.

6. The optical system of claim 1, wherein:
   each mirror of the at least one mirror is driven, at least in part, magnetically.

7. The optical system of claim 1, wherein:
   the at least one mirror comprises plural mirrors; and
   the plural mirrors are each controlled in tip, tilt and piston.

8. The optical system of claim 1, wherein:
   the at least one mirror comprises plural mirrors; and
   each mirror is controlled in piston by a respective magnetic drive that operates to stand that mirror away from a base or rest plane of that mirror, by a variable distance.

9. The optical system of claim 8, wherein the magnetic drive comprises:
   magnetic coils disposed at opposite sides of a rotational flexure; and
   means for electrically energizing the magnetic coils generally independently, to substantially balance the mirror at a desired rotational excursion while standing the mirror away from the base or rest plane to achieve a desired piston excursion.

10. The optical system of claim 8, further comprising:
    means for controlling rotational and piston excursions of each mirror to generally minimize relative optical phase of optical radiation reflected at the plural mirrors, including adjacent mirrors.

11. The optical system of claim 10, further comprising:
    means for detecting or adjusting, or both, relative optical phase.

12. The optical system of claim 11, wherein:
    the detecting-or-adjusting means comprise a wavefront sensor.

13. The optical system of claim 11, wherein:
    the detecting-or-adjusting means comprise an auxiliary optical path that generates and optimizes a point spread function based upon tip, tilt and piston settings of the plural mirrors.

14. The optical system of claim 10, wherein:
    the excursion-controlling means comprise means for holding relative optical phase, of radiation reflected at adjacent mirrors, to modulo $2\pi$ radians within roughly plus-or-minus twenty percent of one wavelength.

15. The optical system of claim 10, wherein:
    the excursion-controlling means comprise means for holding relative optical phase, of radiation reflected at adjacent mirrors, to modulo $2\pi$ radians within roughly plus-or-minus ten percent of one wavelength.

16. The optical system of claim 1, wherein:
    each mirror of the at least one mirror has dimensions in a range exceeding five millimeters; and
    the afocal element is an afocal lens assembly disposed at the aperture, and that magnifies or reduces the varying introduced by the at least one mirror.

17. The optical system of claim 16, wherein:
    the afocal element is disposed generally at the aperture.

18. The optical system of claim 16:
    wherein the afocal lens assembly does not focus such external article onto any solid element of the optical system; and
    further comprising a focusing lens, associated with the detector, for:
    intercepting a radiation beam that has passed through the afocal lens assembly, and that also has been reflected by the at least one mirror, and
    focusing rays, in said radiation beam, from such external article onto the detector.

19. The optical system of claim 16, wherein:
    the afocal element defines the aperture.

20. The optical system of claim 16:
    further comprising an imaging module; and
    wherein the afocal element and the at least one mirror are shared by both:
    the imaging module, and
    the detector with its focusing lens.

21. The optical system of claim 16:
    further comprising a spectral-analysis module; and
    wherein the afocal element and the at least one mirror are shared by both:
    the spectral-analysis module, and
    the detector with its focusing lens.

22. The optical system of claim 16:
    further comprising an auxiliary optical system that includes at least one of:
    a ranging laser for projecting a ranging beam to such article, and
    a ranging-laser receiving module, distinct from the aforesaid detector with its focusing lens, for receiving and analyzing the ranging beam after reflection from such article; and
    wherein the afocal element and the at least one mirror are shared by both:
    one or both of the ranging laser and receiving module, and
    the detector with its focusing lens.

23. The optical system of claim 16:
further comprising an auxiliary optical system that includes at least one of:
a communication-beam transmission module for transmitting a first modulated communication beam toward such article, and
a communication-beam reception module, distinct from the aforesaid detector with its focusing lens, for receiving and interpreting a second modulated communication beam received from such article or from a region of such volume that includes such article; and
wherein the afocal element and the at least one mirror are shared by both:
one or both of the transmission and reception modules, and
the detector with its focusing lens.

24. The optical system of claim 16:
further comprising an auxiliary optical system that includes at least one of:
a communication-beam transmission module for transmitting a first modulated communication beam toward such article, and
a communication-beam reception module for receiving and interpreting a second modulated communication beam received from such article or from a region of such volume that includes such article; and
wherein the afocal element and the at least one mirror are shared by one or both of the transmission and reception modules.

25. The optical system of claim 16:
further comprising a powerful laser for projecting a beam to impair function or structural integrity of such article; and
wherein the afocal element and the at least one mirror are shared by both:
the powerful laser, and
the detector with its focusing lens.

26. The optical system of claim 16:
further comprising a laser for dazzling or confusing either a human operator or optical apparatus associated with such article, or both; and
wherein the afocal element and the at least one mirror are shared by both:
the dazzling laser, and
the detector with its focusing lens.

27. The optical system of claim 16, wherein the external article comprises a radiation source of a particular type, said characteristics comprise existence and presence of the source, and the optical system is for detecting the source and determining its angular location, and:
said optical detector is a detector for such radiation from such source of such particular type; and
further comprising means for automatically responding to the detector by actively servocontrolling the at least one mirror to substantially center an image of a detected source on the detector.

28. The optical system of claim 16:
wherein the detector reports relative location of incident radiation on a sensitive surface of the detector; and
further comprising means for automatically responding to the detector by actively servocontrolling the at least one mirror to substantially center an image of a detected source on the detector.

29. The optical system of claim 28, further comprising:
means for reading and interpreting angular position from mirror position feedback signals while the image is substantially centered on the detector.

30. The optical system of claim 28, wherein:
the responding means comprise means for continuing to servocontrol the at least one mirror to track the already detected source substantially at the detector center.

31. The optical system of claim 30, wherein:
the at least one mirror comprises plural mirrors; and
the continuing means comprise means for using one or more mirrors to track the already-detected source, and one or more other mirrors to instead simultaneously perform another function.

32. The optical system of claim 31, wherein:
the other function comprises searching for another source, not yet detected.

33. The optical system of claim 31, wherein:
the other function comprises operating the auxiliary optical system with respect to said already-detected source or another article or scene.

34. The optical system of claim 30, further comprising:
operating a beam-splitter to enable use of an auxiliary optical system, with respect to said already-detected source or another article or scene, simultaneously with said continuing tracking of the already-detected source.

35. The optical system of claim 16, wherein:
the detector is a position-sensing detector (PSD).

36. The optical system of claim 16, wherein:
the detector is a quad cell.

37. The optical system of claim 16, further comprising:
means for substituting a detector array for the detector, to image the already-detected source or associated articles, or both.

38. The optical system of claim 16, further comprising:
means for directing a response toward the detected article or an article associated therewith, or both.

39. The optical system of claim 38, wherein:
the response-directing means comprise means for emitting a beam of radiation that uses said entrance aperture as an exit aperture and is reflected from said at least one mirror;
wherein the response-directing means share, with such radiation from such source, both:
said entrance aperture, and
said at least one mirror.

40. An optical system for dynamically determining radiation characteristics, including associated angular direction, of an external article in a volume outside the system; said optical system comprising:
an optical detector;
an entrance aperture;
an afocal optically powered element, associated with the aperture, for modifying the field of regard of such external article and such volume as seen by the detector;
wherein the afocal element does not focus such external article onto any solid element of the optical system; and
disposed along an optical path between the detector and the entrance aperture, at least one microelectromechanical-systems mirror, rotatable about plural axes, for causing the detector to address varying portions of such volume outside the optical system and with the enlarged field of regard produced by the afocal element;
said at least one mirror having dimensions in a range greater than five millimeters.

41. The optical system of claim 40, wherein:
said mirror is driven magnetically about at least one of the plural axes.

42. The optical system of claim 41, wherein:
the at least one mirror comprises plural mirrors; and
the plural mirrors are each controlled in tip, tilt and piston.

43. The optical system of claim 42, wherein:
each mirror is controlled in piston by a magnetic drive that operates to stand that mirror away from, or draw it inward toward, a base or rest plane of that mirror, by a variable distance.

44. The optical system of claim 43, wherein the magnetic drive comprises:
magnetic coils disposed at opposite sides of a rotational flexure; and
means for electrically energizing the magnetic coils generally independently, to substantially balance the mirror at a desired rotational excursion while standing the mirror away from, or drawing it in toward, the rest plane or base to achieve a desired piston excursion.

45. The optical system of claim 43, further comprising:
means for controlling rotational and piston excursions of the mirrors to generally minimize relative optical phase of optical radiation reflected from the plural mirrors.

46. The optical system of claim 45, further comprising:
means for detecting or adjusting, or both, relative optical phase.

47. The optical system of claim 46, wherein:
the detecting-or-adjusting means comprise a wavefront sensor.

48. The optical system of claim 46, wherein:
the detecting-or-adjusting means comprise an auxiliary optical path that generates and optimizes a point spread function based upon tip, tilt and piston settings of the plural mirrors.

49. The optical system of claim 45, wherein:
the excursion-controlling means comprise means for holding relative optical phase, of radiation reflected from adjacent mirrors, to modulo $2\pi$ radians within roughly plus-or-minus twenty percent of one wavelength.

50. The optical system of claim 45, wherein:
the excursion-controlling means comprise means for holding relative optical phase, of radiation reflected at adjacent mirrors, to modulo $2\pi$ radians within roughly plus-or-minus ten percent of one wavelength.

51. The optical system of claim 40, wherein:
said mirror dimensions are approximately ten millimeters, or greater.

52. The optical system of claim 40, wherein:
said mirror dimensions are approximately twenty millimeters, or greater.

53. The optical system of claim 40, wherein:
said mirror dimensions are approximately thirty millimeters, or greater.

54. The optical system of claim 40, wherein:
the afocal element is disposed generally at the aperture.

55. The optical system of claim 40, wherein:
the afocal enlarging element defines the aperture.

56. The optical system of claim 40:
further comprising a spectral-analysis module; and
wherein the afocal enlarging element and the at least one mirror are shared by both:
the spectral-analysis module, and
the detector with its focusing lens.

57. The optical system of claim 40:
further comprising an auxiliary optical system that includes at least one of:
a ranging laser for projecting a ranging beam to such article, and
a ranging-laser receiving module, distinct from the aforesaid detector with its focusing lens, for receiving and analyzing the ranging beam after reflection from such article; and
wherein the afocal element and the at least one mirror are shared by both:
one or both of the ranging laser and receiving module, and
the detector with its focusing lens.

58. The optical system of claim 40:
further comprising an auxiliary optical system that includes at least one of:
a communication-beam transmission module for transmitting a first modulated communication beam toward such article, and
a communication-beam reception module, distinct from the aforesaid detector with its focusing lens, for receiving and interpreting a second modulated communication beam received from such article or from a region of such volume that includes such article; and
wherein the afocal element and the at least one mirror are shared by both:
one or both of the transmission and reception modules, and
the detector with its focusing lens.

59. The optical system of claim 40:
further comprising a powerful laser for projecting a beam to impair function or structural integrity of such article; and
wherein the afocal element and the at least one mirror are shared by both:
the powerful laser, and
the detector with its focusing lens.

60. The optical system of claim 40:
further comprising a laser for dazzling or confusing either a human operator or optical apparatus associated with such article, or both; and
wherein the afocal element and the at least one mirror are shared by both:
the dazzling laser, and
the detector with its focusing lens.

* * * * *